United States Patent [19]
Yahara et al.

[11] Patent Number: 5,619,303
[45] Date of Patent: Apr. 8, 1997

[54] PHOTOGRAPHING APPARATUS USABLE IN FIRST AND SECOND POSTURES WITH A FILM AMOUNT DISPLAY FEATURE FOR EACH POSTURE

[75] Inventors: Masashi Yahara; Tsutomu Murayama, both of Yokohama, Japan

[73] Assignee: Canon Kabushiki Kaisha, Tokyo, Japan

[21] Appl. No.: 397,353

[22] Filed: Mar. 2, 1995

[30] Foreign Application Priority Data

Mar. 7, 1994 [JP] Japan .................................. 6-062102
Mar. 24, 1994 [JP] Japan .................................. 6-076301

[51] Int. Cl.$^6$ .................................................. G03B 27/44
[52] U.S. Cl. ............................................................ 355/54
[58] Field of Search ............................. 355/54; 354/215, 354/217, 218

[56] References Cited

U.S. PATENT DOCUMENTS

| | | |
|---|---|---|
| 4,697,900 | 10/1987 | Eguchi et al. ........................ 354/215 |
| 4,751,546 | 6/1988 | Yamamoto et al. .................... 354/468 |
| 4,864,420 | 9/1989 | Aiko ..................................... 358/302 |
| 5,107,290 | 4/1992 | Ohsawa .............................. 354/173.1 |
| 5,166,726 | 11/1992 | Matsumoto et al. .................... 355/54 |
| 5,173,731 | 12/1992 | Yahara .................................... 355/40 |
| 5,208,627 | 5/1993 | Yoshihara et al. ....................... 355/23 |

Primary Examiner—Arthur T. Grimley
Assistant Examiner—David A. Lane
Attorney, Agent, or Firm—Fitzpatrick, Cella, Harper & Scinto

[57] ABSTRACT

A photographing apparatus includes an optical system for projecting an image of an original onto a film, and a camera unit detachably mountable relative to a main body of the apparatus. The camera unit includes a case, which includes a supply reel and a takeup reel. The apparatus also includes a holding unit disposed on the main body of the apparatus for detachably holding the camera unit in a first posture and in a second posture opposite to the first posture, and a display unit for separately displaying a photographable amount of the film within the camera unit when the camera unit is held in the first posture and a photographable amount of the film when the camera unit is held in the second posture.

21 Claims, 28 Drawing Sheets

LEADING-EDGE PORTION OF FILM

TRAILING-EDGE PORTION OF FILM

LEADING-EDGE PORTION OF FILM

TRAILING-EDGE PORTION OF FILM

PHOTOGRAPHING APPARATUS USABLE IN FIRST AND SECOND POSTURES WITH A FILM AMOUNT DISPLAY FEATURE FOR EACH POSTURE

BACKGROUND OF THE INVENTION

1. Field of the Invention

This invention relates to a photographing apparatus for sequentially photographing and recording image information on a recording medium, such as a long microfilm.

2. Description of the Related Art

A typical conventional example of this kind of photographing apparatus is a rotary camera. A description will now be provided illustrating such a rotary camera.

The rotary camera is an automatic photographing apparatus, which sequentially receives materials to be preserved in the form of a microfilm, such as bills (drafts), checks, stock certificates, documents, drawings and the like, photographs the image information of the materials on a long film, and discharges the photographed materials outside the apparatus.

There have been known apparatuses including a plurality of photographing units, which simultaneously photograph a plurality of images on a plurality of films.

FIG. 25 illustrates an example of the above-described rotary camera, serving as the photographing apparatus. In FIG. 25, a photographing apparatus 101 includes a supply unit 102 for supplying a sheet-like object S' into the main body of the photographing apparatus, and discharging unit 103 for discharging the photographed object S' outside the main body of the apparatus. The apparatus 101 also includes an upstream-side conveying unit 104, an exposure unit 105 and a downstream-side conveying unit 106, which are sequentially disposed between the above-described supply unit 102 and discharging unit 103. An object S conveyed to the exposure unit 105 is imaged and exposed on a film F' (see FIG. 26) by an optical system 107 (to be described later).

An outer cover 110 covers the entire apparatus with its lower end portion contacting a circumferential portion of a base 108. The outer cover 110 is pivoted on a rear end portion of the base 108 by a hinge 109 so as to be openable to disclose the front side of the apparatus. A frame 111 mounted on the base 108 contains the upstream-side conveying unit 104 and the exposure unit 105 at its lower portion, the supply unit 102 at its front-end portion 111a, the downstream-side conveying unit 106 and the discharging unit 103 at its upper portion, and a driving system (not shown) at one end portion. A film chamber 112 for accommodating a film F is provided in front of the supply unit 102. An object detection sensor 113 is provided above the upstream-side conveying unit 104 at its upstream side in order to S detect the passage of the object S' and control, for example, a marking LED (light-emitting diode) array 123 and a shutter provided in the vicinity of a projection lens 122 shown in FIG. 26. The exposure unit 105 includes a pair of illuminating lamps 114 and 114', and a pair of parallel guide glasses 115 and 116 through which the object S' passes.

FIG. 26 illustrates the configuration of the optical system 107. That is, image light beams from the surface and the back of the object S passing through the guide glasses 115 and 116 constituting the exposure unit 105, which is positioned substantially at the center of the inside of the apparatus, are reflected by first mirrors 117 and 117', pass through slits 118 and 118' of a slit plate, respectively, and are imaged on to the film F' by an imaging lens 122 after being reflected by second, third and fourth mirrors 119, 120 and 121. The marking LED array 123 is fixed to a base structure (not shown) of the main body of the apparatus at a position adjacent to and outside the optical path of the surface-image light beam of the object S.

In one photographing method of a rotary camera, object images are photographed on the entire width of a long microfilm and the photographing operation is terminated at the end of the film (a simplex or duplex photographing operation). In another method, in which a reciprocating (duo) photographing operation is performed, object images are photographed on a half width of the microfilm. When the photographing operation on the half width has been completed, the microfilm is inverted in the direction of the width and object images are photographed on the other half width of the microfilm in the reverse direction. Apparatuses have been devised in which a film chamber (recording unit) for accommodating a microfilm is detachable as a camera unit. In such a photographing apparatus, a reciprocating (duo) photographing operation can be performed by making the camera unit in an upside-down state.

In the above-described conventional approach, the camera unit can be inserted in an upside-down state, and it is first detached from the main body of the apparatus when performing a reciprocating (duo) photographing operation by making the camera unit in an upside-down state. In such a case, however, since the camera unit can be inserted either in a normal state or in an upside-down state, the camera unit may be frequently inserted in a wrong posture. In addition, since there is no display of information relating to the exposed position on the microfilm, care must be taken when the camera unit is detached.

If the camera unit is inserted in a wrong posture, object images are not correctly photographed on the microfilm because exposed positions on the microfilm and the moving direction of the microfilm differ depending on the posture, so that photographed images may be unsuitable.

In a photographing apparatus using a long microfilm, in order to prevent a leading-edge portion or a trailing-edge portion of the film from being exposed to external light when loading the film or taking out and developing the film, feeding of the leading edge of the film (leader feeding) and feeding of the trailing edge of the film (trailer feeding) are performed. When loading the film, leader feeding is usually started after winding a certain amount of the leading-edge portion of the film around a takeup reel or the like. Film feeding in the photographing apparatus is performed, in many cases, at a very low speed because the reduction ratio of the apparatus is small, so that a long time is required for the film feeding.

In some photographing apparatuses using long microfilms, the amount fed from a leading-edge portion of the film is displayed on an odometer so that the used amount of the film or the current photographing position on the film is known. In other apparatuses, a warning (indicating a near-end state of the film) is provided when the exposed position approaches the end of the film.

In the above-described conventional approach, when performing a reciprocating photographing operation by inverting the film in the direction of the width, the film is completely wound after terminating the photographing operation, whereby photographed images are prevented from being exposed when taking out the film. In the above-described photographing apparatus, film feeding is performed at a very low speed because a photographing operation is performed at a high reduction ratio. In order to feed the film at a high speed when it is intended to perform only film feeding, for example, another motor for film feeding must be provided, or the gear ratio must be changed using a variable speed gear, thereby increasing the complexity of the configuration and the cost of the apparatus. Since film feeding is usually performed only at a low speed, a long time is required for feeding the film even if the fed amount of the film is small.

Since there is the possibility that a leading-edge portion of the film has been exposed, a photographing operation after inverting the film in the direction of the width must be terminated at a position more or less before the leading edge of the film, thereby causing wasteful use of the film.

Since the display of the odometer starts from a leading-edge portion of the film, the display does not indicate the exact amount of a photographable region. Similarly, a warning of a near-end state of the film is not provided based on the absolute amount of a photographable region.

SUMMARY OF THE INVENTION

The present invention has been made in consideration of the above-described problems.

It is an object of the present invention to provide a photographing apparatus which includes display means capable of confirming the remaining photographable amount of a recording medium and the posture of an inserted camera unit in the vertical direction when performing a reciprocating (duo) photographing operation by inserting the camera unit in an upside-down state, and a control mechanism for controlling the apparatus so that the camera unit is automatically detached when it is inserted in a wrong posture.

It is another object of the present invention to shorten the time required for feeding a film, to simplify the operation and effectively use the film by appropriately controlling film feeding, and to exactly display the state of a photographing apparatus.

These objects are achieved by a photographing apparatus comprising image information photographing means capable of performing a reciprocating photographing operation of image information on a long recording medium, mounting means capable of detachably mounting a camera unit accommodating the long recording medium from a main body of the photographing apparatus, display means for indicating a state of the camera unit, and means for automatically detaching the camera unit from the main body of the apparatus and switching a display on the camera unit to a photographing operation in the opposite direction when the remaining amount of the long recording medium becomes small during a photographing operation in one direction.

In another aspect, in a photographing apparatus capable of performing a reciprocating photographing operation by mounting a camera unit in an upside-down state, the camera unit includes means for displaying the remaining photographable amount in a reciprocating region of a long recording medium in such a manner that it can display a status in a one-way photographing operation or a reciprocating photographing operation.

The above-described photographing apparatus capable of performing a reciprocating photographing operation also includes a mechanism for detecting the posture of the camera unit in the vertical direction according to the connection state of a contact between the camera unit and the main body of the photographing apparatus, and a mechanism and a control unit for displaying a wrong state and detaching the camera unit from the main body of the apparatus when the photographing state of the camera unit does not coincide with the posture of the camera unit in the vertical direction.

In another aspect, in a photographing apparatus capable of performing a reciprocating photographing operation by mounting a camera unit accommodating a rolled film while making the camera unit in an upside-down state include a display unit, in which the remaining photographable amount in the forward direction and the remaining photographable amount in the reverse direction are displayed on two stages, and which can display the status in a one-way photographing operation or a reciprocating photographing operation according to a display state on one of the stages.

The above-described display unit may be provided in the camera unit.

The camera unit may also include a photographing lens.

When the remaining photographable amount of the film becomes small, the camera unit is automatically detached from the main body of the photographing apparatus, and the display on the camera unit is switched to a photographing operation in the reverse direction.

In the photographing apparatus having the above-described configuration, when the remaining amount of the long recording medium (film) becomes small during the photographing operation in the forward direction, the camera unit is automatically detached, and the display on the camera unit is switched to a photographing operation in the reverse direction. When the camera unit has been mounted in a wrong posture in the vertical direction, a warning indicating that fact is displayed.

The display means on the camera unit of the photographing apparatus capable of performing a reciprocating (duo) photographing operation by mounting the camera unit in an upside-down state can display a status in a one-way photographing operation and a reciprocating photographing operation, and displays the remaining photographable amount of the long recording medium using a U-shaped character indicating switching between the forward direction and the reverse direction.

In the photographing apparatus capable of performing a reciprocating (duo) photographing operation, the posture of the camera unit in the vertical direction can be detected by the connection state of the contact between the recording unit and the main body of the photographing apparatus. When the photographing state of the camera unit does not coincide with the posture of the camera unit in the vertical direction, that fact is displayed and the camera unit is detached.

By providing the display unit in the camera unit, the photographing state of a reciprocating photographing operation is displayed on the camera unit.

By providing the photographing lens in the camera unit, a photographing operation can be performed using a lens corresponding to the camera unit.

When the remaining photographable amount of the film becomes small, the camera unit is automatically detached from the main body of the photographing apparatus, and the display of the camera unit is switched to a photographing operation in the reverse direction.

In still another aspect, in an image-information photographing apparatus comprising image-information photographing means capable of performing a reciprocating (duo)

photographing operation of image information on a long recording medium, and measurement means for measuring the fed amount of the long recording medium, the position to start the photographing operation on the recording medium is stored, and positioning control of the recording medium is performed.

In the photographing operation after inverting the photographing direction, the photographing operation is terminated after feeding the recording medium at least to the position to start the photographing operation based on the stored position to start the photographing operation, or feeding of the recording medium is stopped without winding the recording medium to the end.

If the photographing operation is performed in the vicinity of the end of the photographable region of the long recording medium after inverting the photographing direction, a warning to terminate the photographing operation is generated based on the position to start the photographing operation.

If the photographing position is after a predetermined position in the vicinity of the end of the photographable region of the long recording medium when the photographing operation is interrupted after inverting the photographing direction, it is determined that the photographing operation is automatically terminated, and the photographing operation is terminated after feeding the recording medium at least to the position to start the photographing operation.

When the recording medium is fed to the position to start the photographing operation after inverting the photographing direction, the photographing operation is prohibited.

The photographing apparatus further includes display means for displaying the fed amount of the long recording medium. When performing a reciprocating (duo) photographing operation on the long recording medium, the position to start the photographing operation is stored as a reference position. During a photographing operation in the forward direction, the fed amount of the recording medium from the reference position is added to the display. During a photographing operation in the reverse direction, the fed amount of the recording medium is displayed by subtracting the fed amount in the reverse direction from the initial fed amount.

By storing the position to start the photographing operation on the recording medium and performing positioning control of the recording medium, feeding of the recording medium can be controlled.

In the photographing operation after inverting the photographing direction, the photographing operation is terminated after feeding the recording medium at least to the position to start the photographing operation, or feeding of the recording medium is stopped without winding the recording medium to the end. Thus, the recording medium is ready to be exchanged when the photographing operation is terminated.

If the photographing operation is performed in the vicinity of the end of the photographable region of the long recording medium after inverting the photographing direction, a warning to terminate the photographing operation is generated. Thus, the operator is notified that the photographing operation is close to the end.

If the photographing position is after a predetermined position in the vicinity of the end of the photographable region of the long recording medium when the photographing operation is interrupted after inverting the photographing direction, it is determined that the photographing operation is automatically terminated, and the photographing operation is terminated after feeding the recording medium at least to the position to start the photographing operation.

When the recording medium is fed to the position to start the photographing operation after inverting the photographing direction, the photographing operation is prohibited.

During a photographing operation in the forward direction, the fed amount of the long recording medium from the reference position, i.e., the position to start the photographing operation, is added to the display. During a photographing operation in the reverse direction, the fed amount of the recording medium is displayed by subtracting the fed amount in the reverse direction from the initial fed amount.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 28 is a block diagram of a control circuit for operating the photographing apparatus shown in FIG. 1 according to the sixth embodiment;

DETAILED DESCRIPTION OF THE PREFERRED EMBODIMENTS

Preferred embodiments of the present invention will now be described in detail with reference to the drawings.

First Embodiment

Figure 1:
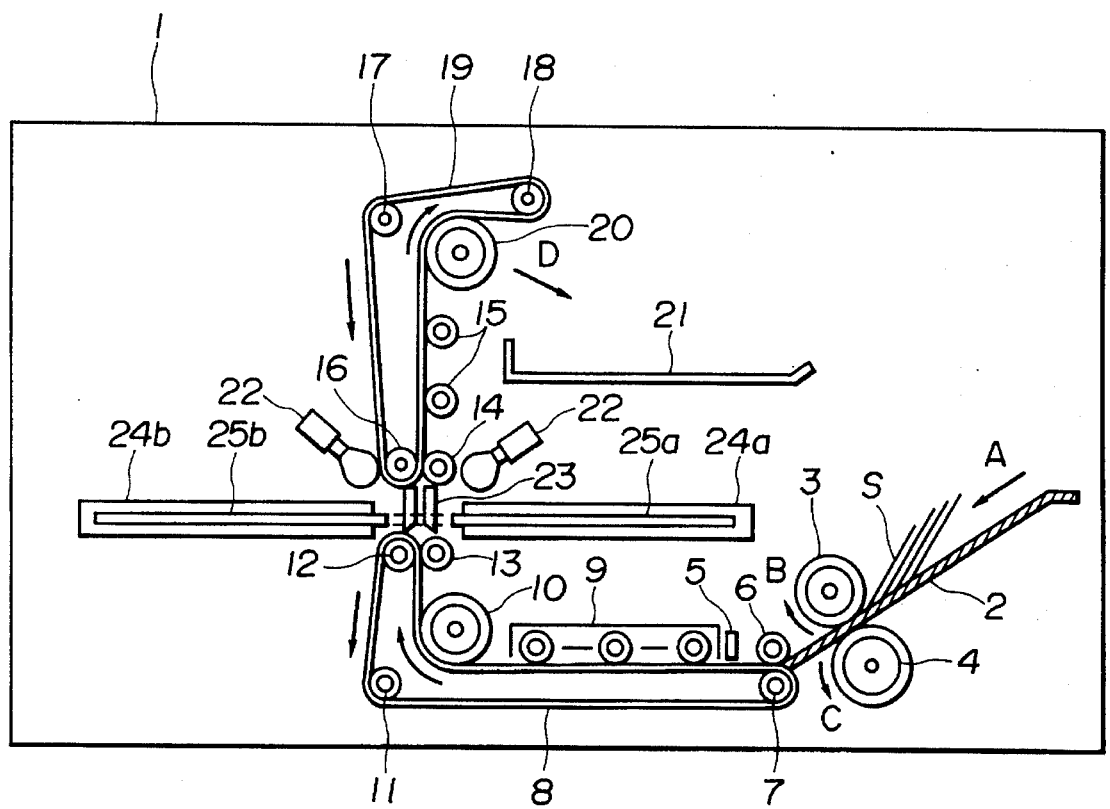
FIG. 1 is a schematic cross-sectional view of a photographing apparatus according to a first embodiment of the present invention.

FIG. 1 is a schematic diagram illustrating the configuration of an object conveying system of a photographing apparatus 1, serving as an image-information photographing apparatus, according to a first embodiment of the present invention. In FIG. 1, when sheet-like objects S are placed on a downwardly inclined sheet-feeding tray 2, the objects S move in the direction of an arrow A due to gravity. The objects S are individually separated by a sheet-feeding roller 3 rotating in the direction of an arrow B and a separation roller 4 rotating in the direction of an arrow C.

A lower conveying belt 8 is stretched between belt rollers 7 and 12 with an appropriate tension supplied by a tension roller 11 so as to convey the separated object S by the rotation of a lower driving roller 10. An idle roller 6 and a guide unit 9 press the object S against the lower conveying belt 8. An object detection unit 5 for detecting the conveyed object S is disposed between the idle roller 6 and the guide unit 9, and is used for controlling a shutter 49a of a camera unit 40a shown in FIG. 5 (to be described later).

The object S conveyed from the horizontal direction to the vertical direction by the lower conveying belt 8 passes through a pair of guide glasses 23. At that time, two surfaces of the object S are simultaneously illuminated by a pair of illuminating lamps 22. Nip rollers 12, 13 and 14, 16 are provided below and above the guide glasses 23, respectively. An upper conveying belt 19 is stretched between bent rollers 16 and 18 with an appropriate tension supplied by a tension roller 17. The object S passing through the guide glasses 23 is conveyed upward by the rotation of an upper driving roller 20. Idle rollers 15 press the object S against the upper conveying belt 19.

The path of the conveyed object S is switched from the vertical direction to the horizontal direction by the upper conveying belt 19, and the object S moves in the direction of an arrow D and is discharged onto a sheet-discharging tray 21.

First mirrors 24a and 24b having an angle of 45° to the right and to the left, respectively, with respect to the plane of the object S moving in the vertical direction are disposed at symmetrical positions at two sides of the guide glasses 23, constituting an exposure unit. The first mirrors 24a and 24b as well as the shafts of the rollers for conveying the object are supported on a base structure (not shown) within the main body of the photographing apparatus 1.

Figure 2:
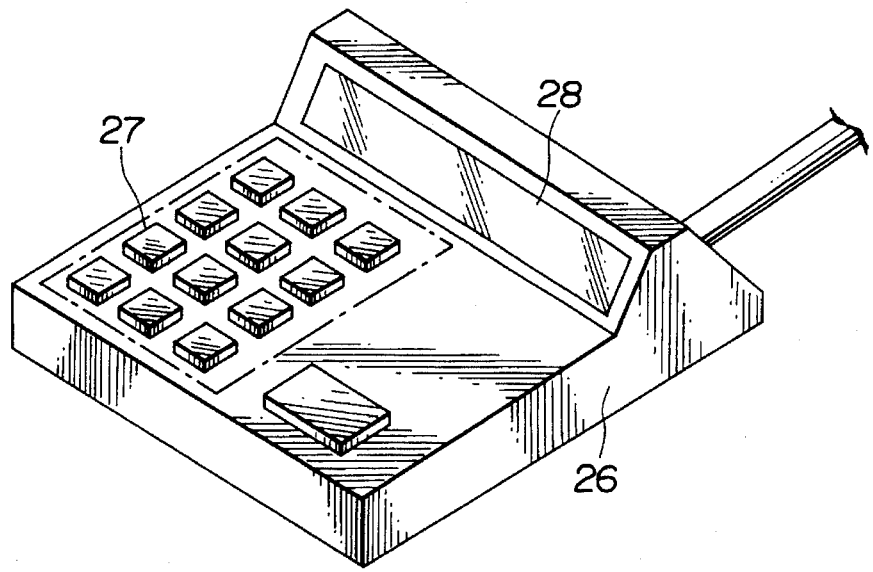
FIG. 2 is a perspective view of a control unit of the photographing apparatus shown in FIG. 1.

FIG. 2 is a perspective view of a control unit 26 for controlling the operation of the photographing apparatus 1. In FIG. 2, the control unit 26 includes a keyboard 27 and a display 28, and is electrically connected to a CPU (not shown) of the photographing apparatus 1. The photographing apparatus 1 is controlled via the CPU by operating keys on the keyboard 27.

Figure 3:
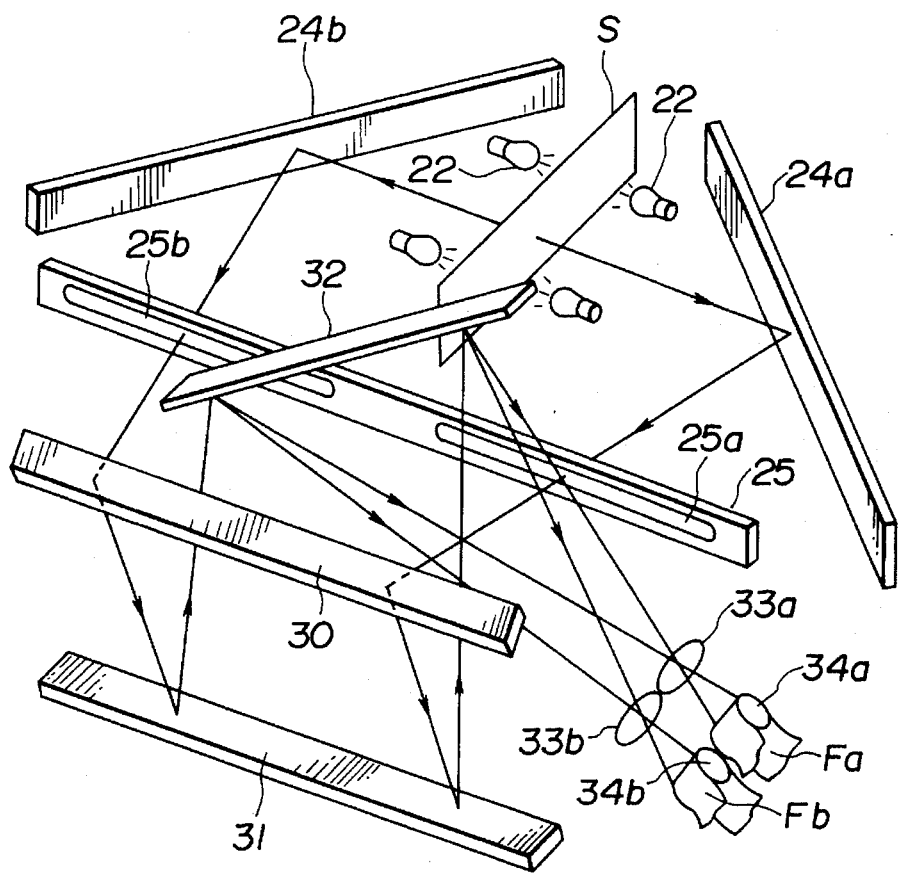
FIG. 3 is a diagram illustrating the configuration of an exposure optical system of the photographing apparatus shown in FIG. 1.

FIG. 3 is a perspective view illustrating the configuration of mirrors constituting an optical system of the photographing apparatus 1. In the exposure unit shown in FIG. 3, light beams representing images on two surfaces of the object S illuminated by the illuminating lamps 22 are reflected by the first mirrors 24a and 24b, pass through slits 25a and 25b in a slit plate 25, respectively, and are reflected by a second mirror 30 in an obliquely downward direction.

The light beams are then upwardly reflected by a third mirror 31 in a vertical direction, and are reflected by a fourth mirror 32 in an obliquely downward direction. The light beams reflected by the fourth mirror 32 pass through projection lenses 33a and 33b, and are projected and imaged onto films Fa and Fb, serving as long recording media driven by capstan rollers 34a and 34b, respectively, within camera units 40a and 40b, serving as film accommodating cases, shown in FIGS. 4 and 5 (to be described later), respectively.

Figure 4:
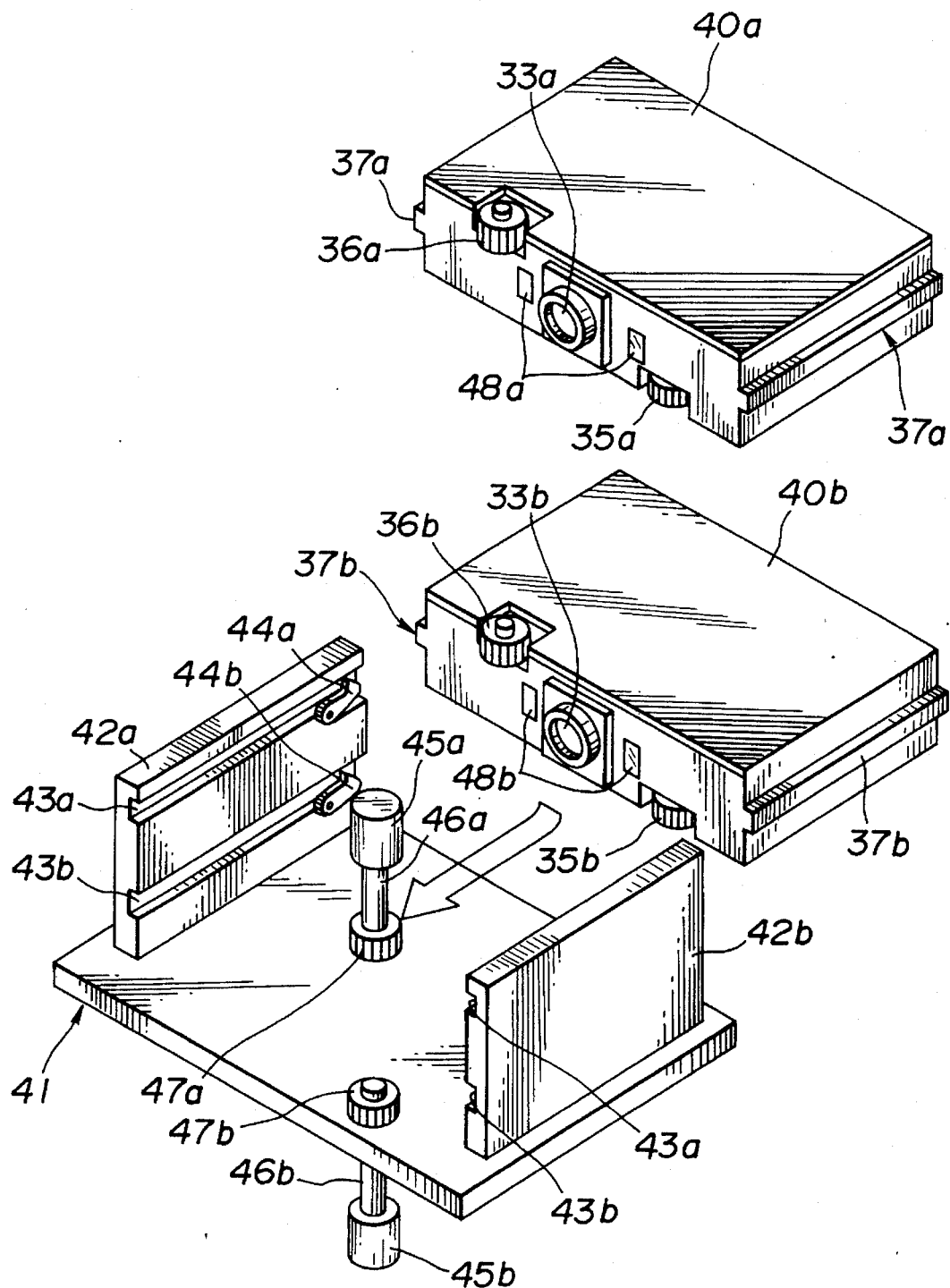
FIG. 4 is a perspective view illustrating camera units and a mounting unit of the photographing apparatus shown in FIG. 1.

FIG. 4 is a perspective view illustrating the camera units 40a and 40b and a driving system thereof.

In FIG. 4, the camera units 40a and 40b include the projection lenses 33a and 33b, connecting gears 35a and 36a, and 35b and 36b, and pairs of positioning ribs 37a and 37b, respectively. The positioning ribs 37a and 37b, and pairs of guide grooves 43a and 43b formed on camera guides 42a and 42b fixed to a camera chasis 41, respectively, constitute a camera-unit mounting/detaching means. The camera units 40a and 40b are fixed by camera-locking pawls 44a and 44b, respectively, in their inserted state.

The connecting gears 35a and 35b of the fixed camera units 40a and 40b are connected to driving gears 47a and 47b connected to camera driving motors 45a and 45b via rotation shafts 46a and 46b, respectively. By operating the driving motors 45a and 45b, the films Fa and Fb set within the camera units 40a and 40b can be fed, respectively.

The camera units 40a and 40b can be electrically connected to the main body of the apparatus through connector units 48a and 48b, respectively, connected to connectors (not shown) of the main body of the apparatus when the camera units 40a and 40b are set within the camera chasis 41.

The camera units 40a and 40b can also be inserted into the camera chasis 41 while inverting them in.

That is, as in the above-described state, when the camera units 40a and 40b are inserted in an upside-down state, the connecting gears 36a and 36b of the camera units 40a and 40b are connected to driving gears 47a and 47b connected to camera driving motors 45a and 45b via rotation shafts 46a and 46b, respectively. By operating the driving motors 45a and 45b, the films Fa and Fb set within the camera units 40a and 40b can be fed, respectively.

By inserting the camera units 40a and 40b in an upside-down state from the state shown in FIG. 4, the films Fa and Fb within the camera units 40a and 40b, respectively, are fed in a direction opposite to the direction in the state of FIG. 4.

Figure 5:
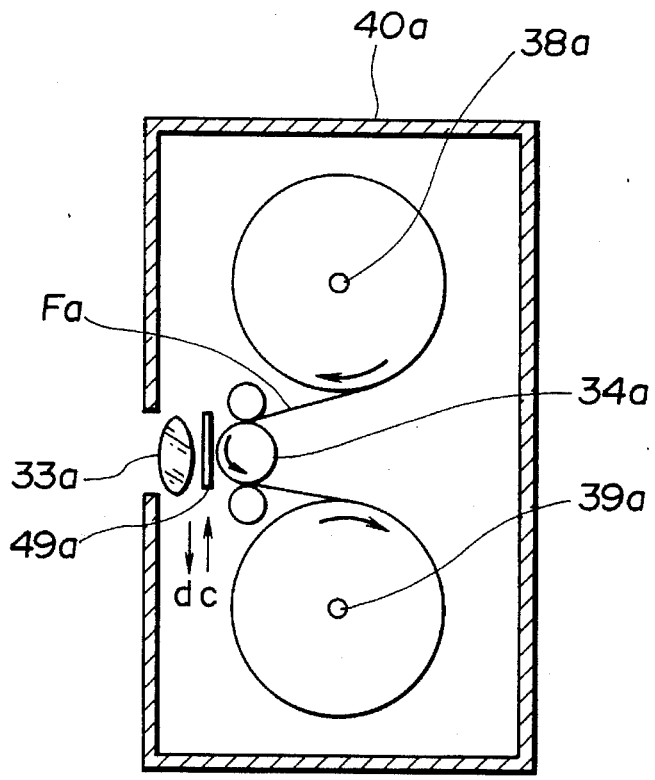
FIG. 5 is a schematic cross-sectional view of the camera unit shown in FIG. 4.

FIG. 5 is a schematic diagram illustrating the configuration of the inside of the camera unit 40a. The camera unit 40b also has the same configuration.

As described above, the camera unit 40a includes the projection lens 33a and the capstan roller 34a. An undeveloped film Fa fed from a supply reel 38a around which the film Fa is wound is exposed to an object image imaged by the projection lens 33a and the shutter 49a at the position of the capstan roller 34a, and is wound around a takeup reel 39a.

The capstan roller 34a is connected to the camera driving motor 45a shown in FIG. 4. The number of revolutions of the capstan roller 34a may be set so that the reduced projected image is synchronized with the film Fa by feeding the film Fa at a speed obtained by multiplying the conveying speed of the object by a reduction ratio of the camera unit 40a.

The films Fa and Fb may be fed at a speed corresponding to the reduction ratio of the camera units 40a and 40b by performing speed reduction corresponding to the reduction ratio by gears (not shown) provided between the connecting gears 35a and 35b and the capstan rollers 34a and 34b, while rotating the camera driving motors 45a and 45b at a constant speed proportional to the object conveying speed irrespective of the reduction ratio of the camera units 40a and 40b, respectively.

The shutter 49a is connected to a solenoid (not shown). By operating the solenoid so as to move the shutter 49a in the direction of an arrow c or d, the object image can be projected onto the film Fa or can be blocked.

Figure 6:
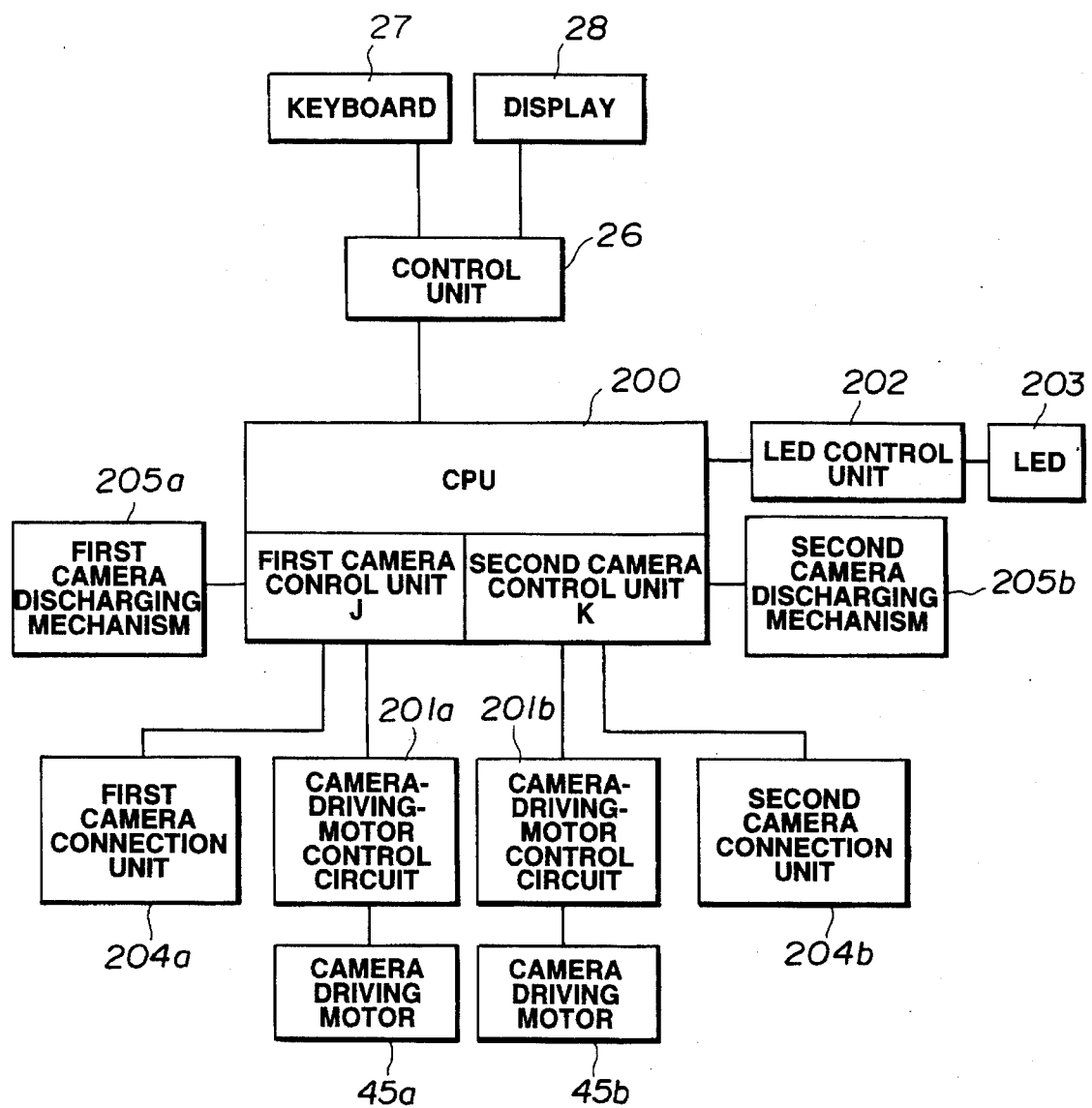
FIG. 6 is a block diagram of a control circuit for operating the photographing apparatus shown in FIG. 1.

FIG. 6 is a block diagram of a control circuit for operating the photographing apparatus 1.

The control unit 26 including the keyboard 27 and the display 28 is connected to a CPU (central processing unit) 200 within the photographing apparatus 1. A first camera control unit J and a second camera control unit K of the CPU 200 are connected to the camera driving motors 45a and 45b via camera-driving-motor control circuits 201a and 201b, respectively. The CPU 200 is also connected to an LED (light-emitting diode) 203 for marking via an LED control circuit 202.

The first camera control unit J and the second camera control unit K of the CPU 200 are connected to a first camera connection unit 204a and a second camera connection unit 204b, and to a first camera discharging mechanism 205a and a second camera discharging mechanism 205b, respectively. The first camera discharging mechanism 205a and the second camera discharging mechanism 205b first release the locked state of the camera units 40a and 40b by the camera locking pawls 44a and 44b, then push the camera units 40a and 40b along the camera guides 42a and 42b in a direction opposite to the insertion direction by solenoid plungers or coil springs (not shown) to detach the camera units 40a and 40b from their mounted positions, and to discharge the camera units 40a and 40b to positions where they can be easily taken out, respectively.

Figure 7:
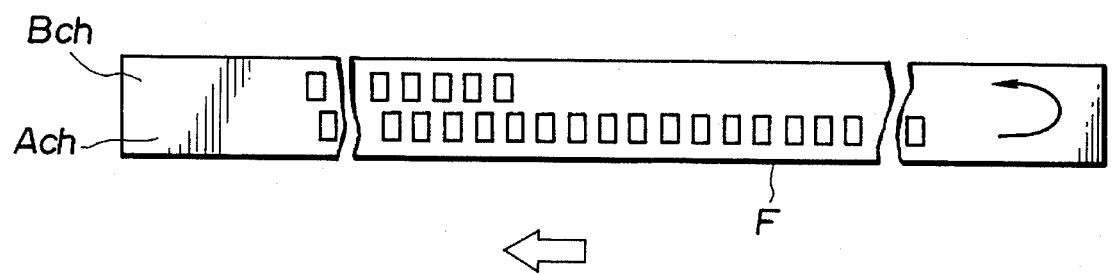
FIG. 7 illustrates a duo film on which images have been photographed.
Figure 8:
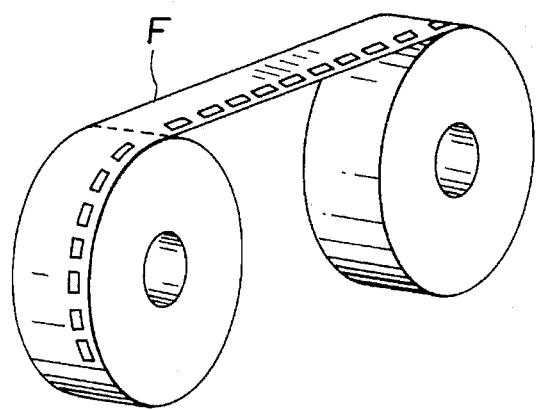
FIG. 8 is a perspective view of a duo film on which images have been photographed.

FIG. 7 illustrates a duo film F on which images are photographed. The side where images are first photographed is termed channel A, and the side where images are photographed in the reverse direction is termed channel B. FIG. 8 illustrates the rolled film F.

In the first embodiment, when performing a reciprocating photographing operation of images on a long microfilm, the camera unit is discharged when the photographing operation on channel A comes close to the end of the film, and display on the camera unit is switched to channel B.

In an ordinary (one-way) photographing operation, a warning is generated when the photographing operation comes close to the end of the film. On the other hand, as it is generally known, in a reciprocating photographing operation, it is necessary to stop the photographing operation at a certain time in order to prevent exposure (fog) of a trailing-end portion of the film.

Figure 9:
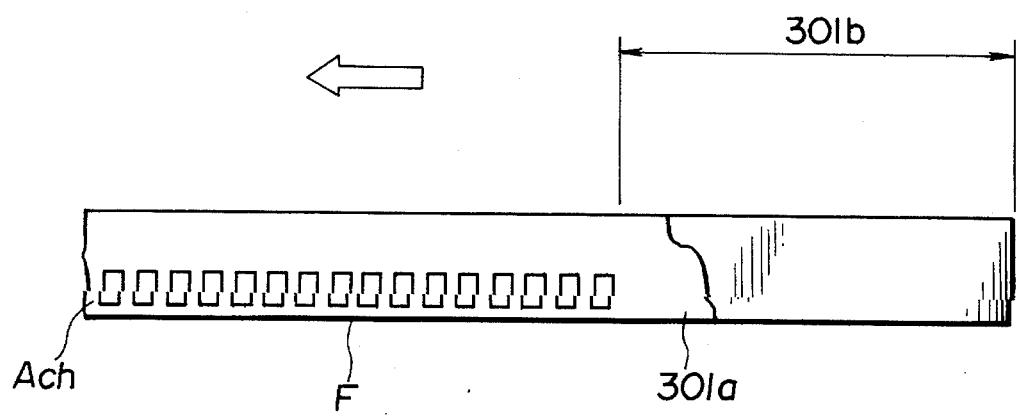
FIG. 9 illustrates a duo film on which images have been photographed on one channel in the first embodiment.
Figure 10:
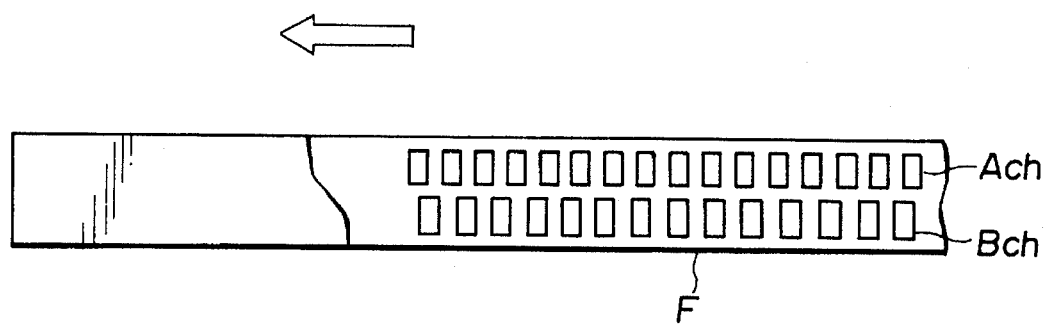
FIG. 10 illustrates the duo film on which additional images have also been photographed on another channel in the first embodiment.

FIGS. 9 and 10 illustrate photographing states on a duo film. As shown in FIG. 9, when an image to be photographed reaches a position in the vicinity of the trailing edge of the film (301a) during a photographing operation on channel A, there is the possibility that a portion after that position (301b) has already been exposed. Hence, the photographing operation is interrupted, the film is inverted in the direction of the width, as shown in FIG. 10, and a photographing operation on channel B is started in the reverse direction. In FIGS. 9 and 10, a block arrow indicates the moving direction of the film.

Figure 11:
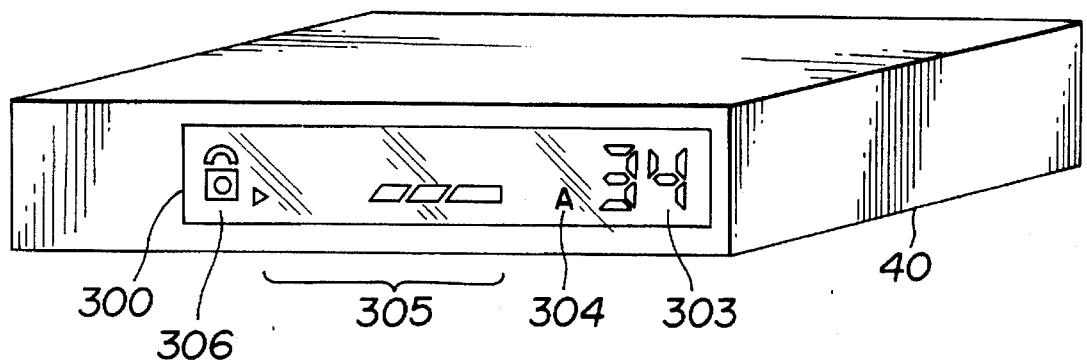
FIG. 11 illustrates a camera unit during a photographing operation on channel A in the first embodiment.
Figure 12:
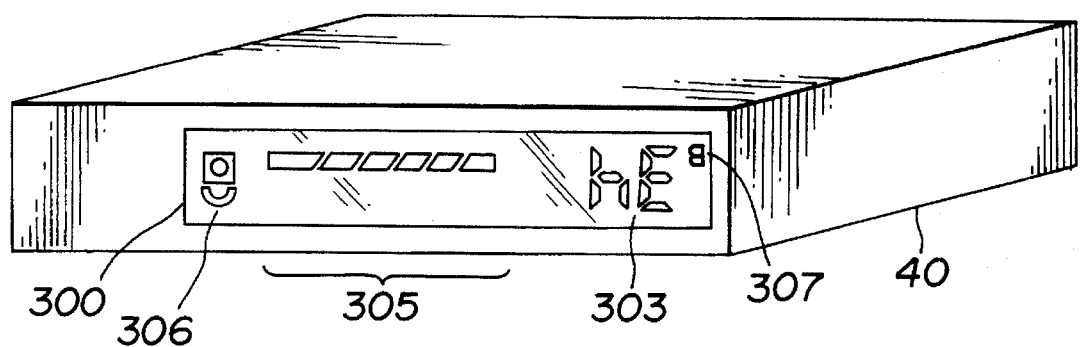
FIG. 12 illustrates the camera unit after the photographing operation on channel A in the first embodiment.
Figure 13:
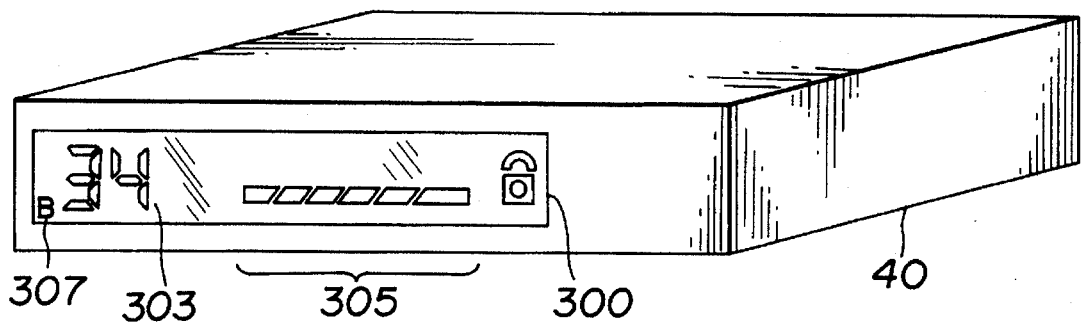
FIG. 13 illustrates the camera unit during a photographing operation on channel B in the first embodiment.

FIGS. 11 through 13 illustrate states of the camera unit and a camera-unit display device, serving as display means, provided on one side surface of the camera unit opposite to the direction of insertion of the camera unit. In FIGS. 11 through 13, reference numeral 303 represents a number peculiar to the camera unit, reference numeral 304 represents that the photographing operation is performed on channel A, reference numeral 307 represents that the photographing operation is performed on channel B, reference numeral 305 represents a bar display roughly indicating the remaining photographable amount of the film within the camera unit, and reference numeral 306 represents a display indicating that the camera unit is locked in order to prevent the film within the camera unit from being taken out.

FIG. 11 illustrates the camera unit during a photographing operation on channel A. The remaining amount of the film 305 decreases as the photographing operation proceeds. When an image to be photographed comes close to the trailing edge of the film as the photographing operation proceeds, the photographing operation cannot proceed further. In FIG. 12, the display of the camera unit is inverted and the channel is switched from channel A (304) to channel B (307). At that time, the camera unit is automatically discharged by the camera discharging mechanism while the camera unit maintains the state shown in FIG. 11. FIG. 13 illustrates a state in which the camera unit is inserted in the opposite state after being discharged, and a photographing operation on channel B is started.

Figure 14:
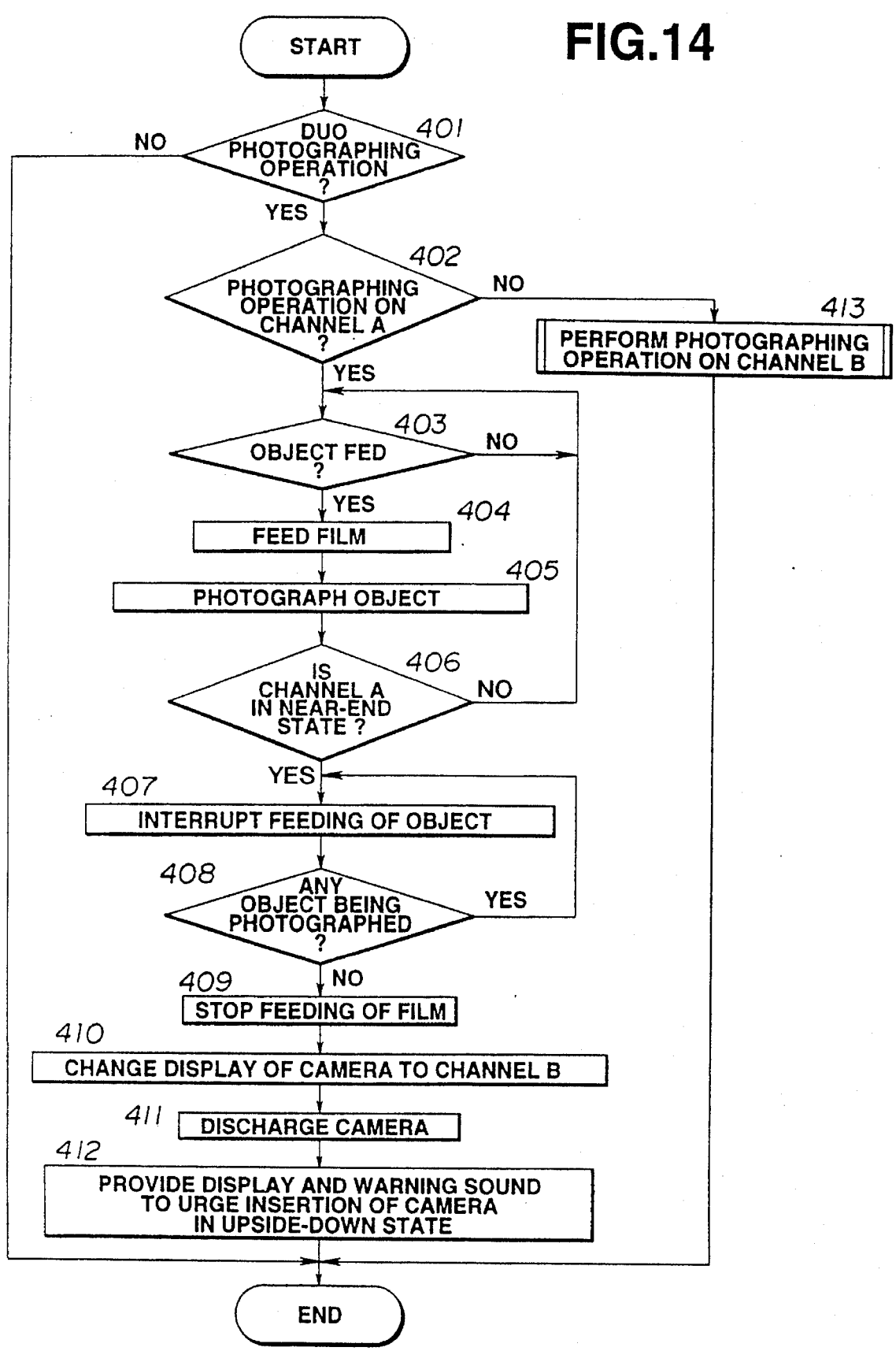
FIG. 14 is a flowchart illustrating the processing in the first embodiment.

The discharge of the camera unit and the reversal of the display will be described with reference to the flowchart shown in FIG. 14.

First, in step 401, it is determined if a duo photographing operation is performed. If the result of the determination is negative, the processing of this flowchart is not performed. If the result of the determination is affirmative, it is then determined if the photographing operation is performed on channel A. If the result of the determination is negative, a photographing operation on channel B is performed (step 413). A detailed description of this operation will be omitted. If the result of the determination in step 402 is affirmative, it is awaited until an object to be photographed is fed (step 403). When the object has been fed, the film is fed (step 404) and the object is photographed (step 405), and it is awaited until a object image comes to a trailing-edge portion of the film (until channel A becomes in a near-end state) (step 406). When channel A has become in a near-end state, feeding of the next object is interrupted (step 407), and it is awaited until there is no object being photographed (step 408), and the feeding of the film is stopped (step 409). Thereafter, the display of the camera unit is switched to channel B as shown in FIG. 12 (step 410), the camera unit is discharged (step 411), and a display and a warning to urge insertion of the camera unit in an upside-down state are provided (step 412).

As described above, in the microfilm photographing apparatus in which a duo photographing operation is performed by making the camera unit in an upside-down state, the camera unit is automatically discharged when a photographing operation on channel A becomes in a near-end state, and the display of the camera unit is switched to channel B. Thus, the direction of insertion of the camera unit becomes clear, and it is possible to prevent a faulty photographing operation, for example, continuation of the photographing operation on channel A which has been terminated.

Second Embodiment

Figure 15:
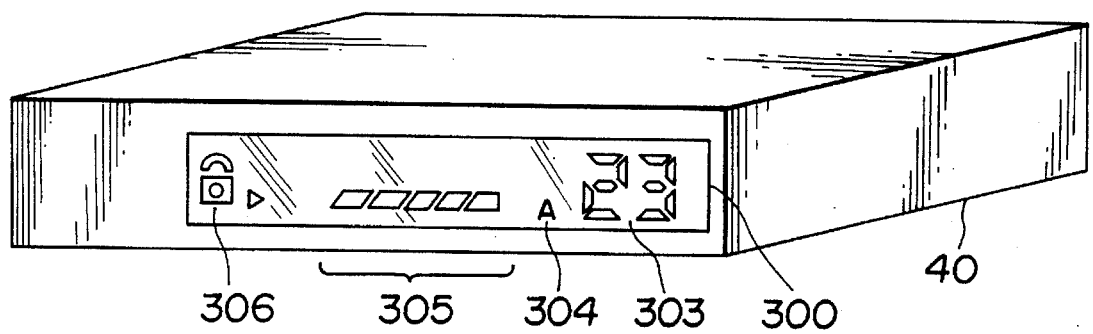
FIG. 15 illustrates a camera unit during a one-way photographing operation in a second embodiment of the present invention.
Figure 16:
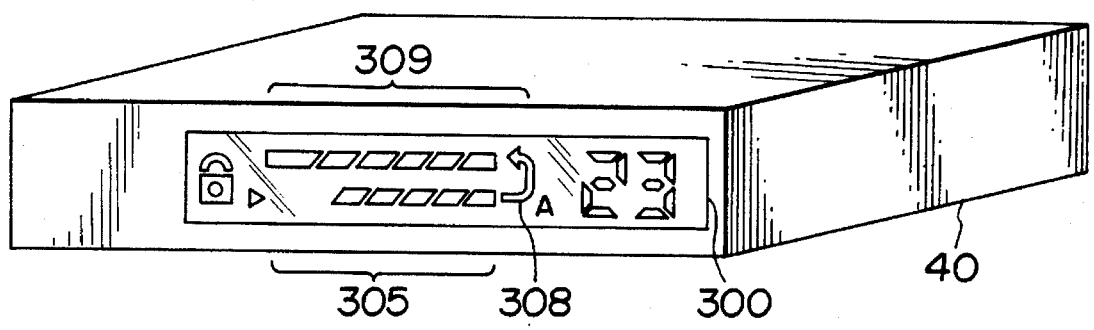
FIG. 16 illustrates the camera unit during a reciprocating photographing operation on channel A in the second embodiment.
Figure 17:
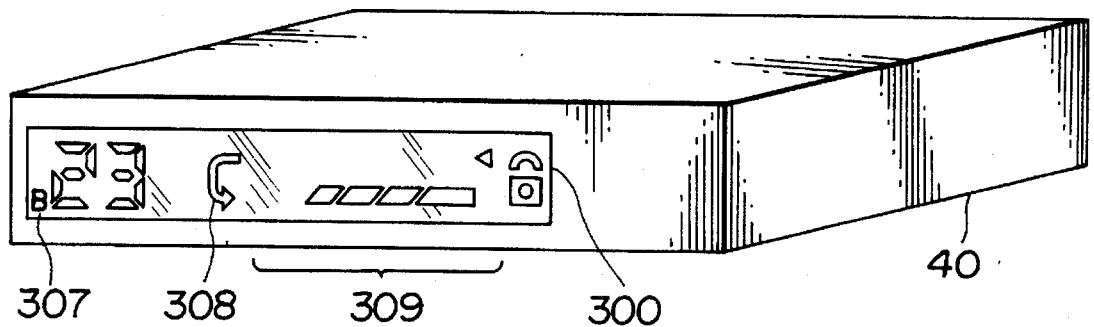
FIG. 17 illustrates the camera unit during a reciprocating photographing operation on channel B in the second embodiment.

FIGS. 15 through 17 illustrate a camera-unit display device according to a second embodiment of the present invention.

FIG. 15 illustrates display on a camera unit in which a one-way photographing operation is performed. In FIG. 15, a display 308 of the remaining amount of the film comprises a single bar. FIG. 16 illustrates display on the camera unit in which a reciprocating photographing operation is performed. In FIG. 16, two-stage display is performed in which a return (duo) display 308 expressed by a U-shaped figure and a display 309 of the remaining amount of the film on channel B are added to the display 305 of the remaining amount of the film on channel A shown in FIG. 15. As the photographing operation proceeds, the value of the display 305 of the remaining amount of the film on channel A decreases and has the minimum value when an image to be photographed reaches a portion in the vicinity of the trailing edge of the film. FIG. 17 illustrates a state in which the photographing operation on channel A has been terminated, the display has been inverted, and a photographing operation on channel B has been started. Since the photographing operation on channel A has been terminated, the display 305 of the remaining amount of the film on channel A has disappeared, but the U-like FIG. 308 indicating a reciprocating photographing operation remains. As the photographing operation on channel B proceeds, the display 309 of the remaining amount of the film on channel B decreases. While FIG. 16 indicates that the photographing operation on channel A is proceeding, it can be clearly understood that a reciprocating photographing operation is performed because of the two-stage display of the remaining amount of the film.

Even after switching to the photographing operation on channel B as shown in FIG. 17, it can be understood that a reciprocating (duo) photographing operation is performed on channel B only by seeing the display of the camera unit.

Third Embodiment

Figure 18:
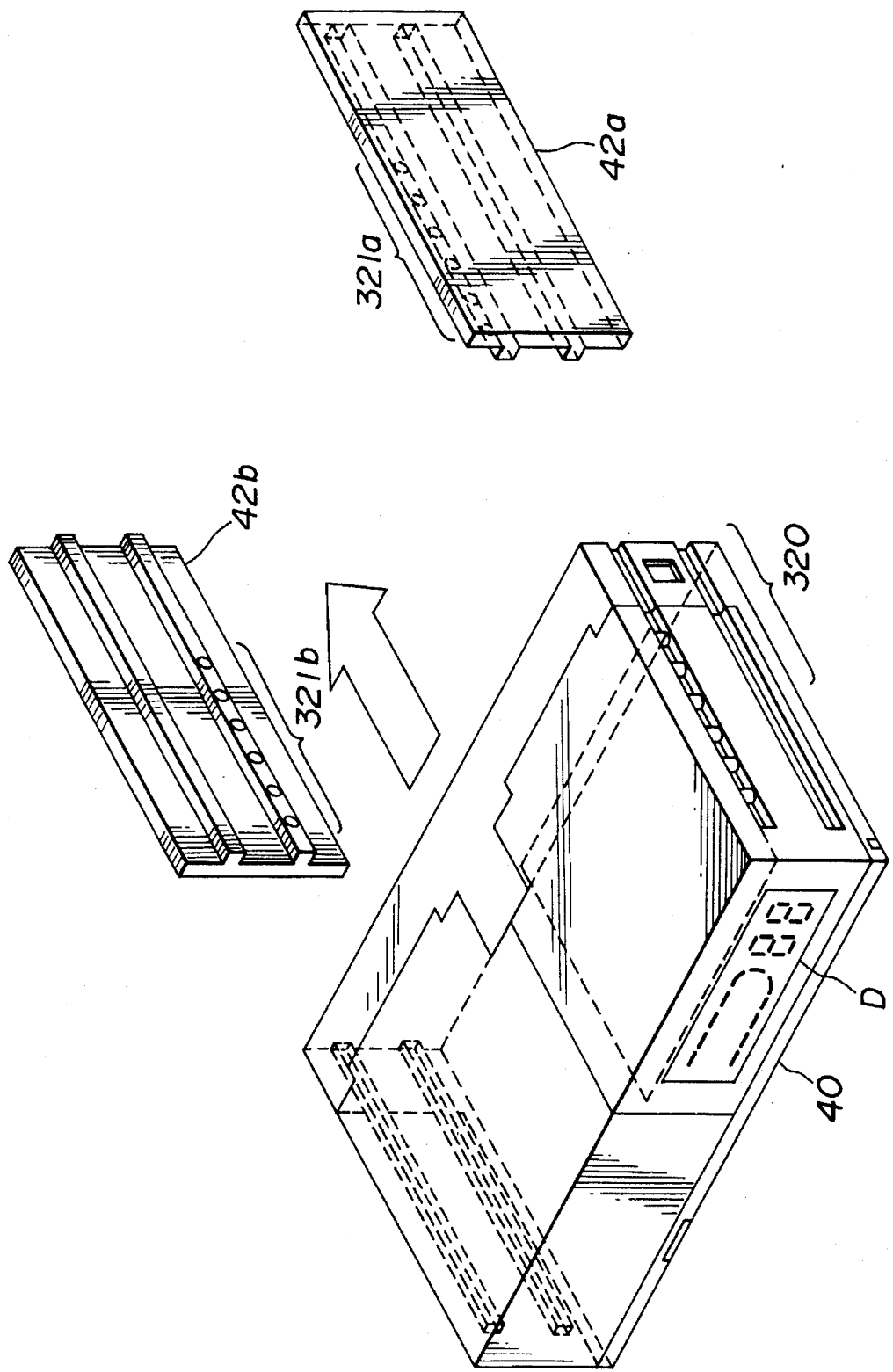
FIG. 18 is a perspective view of contact portions between a camera unit and a mounting unit in a third embodiment of the present invention.
Figure 19A:
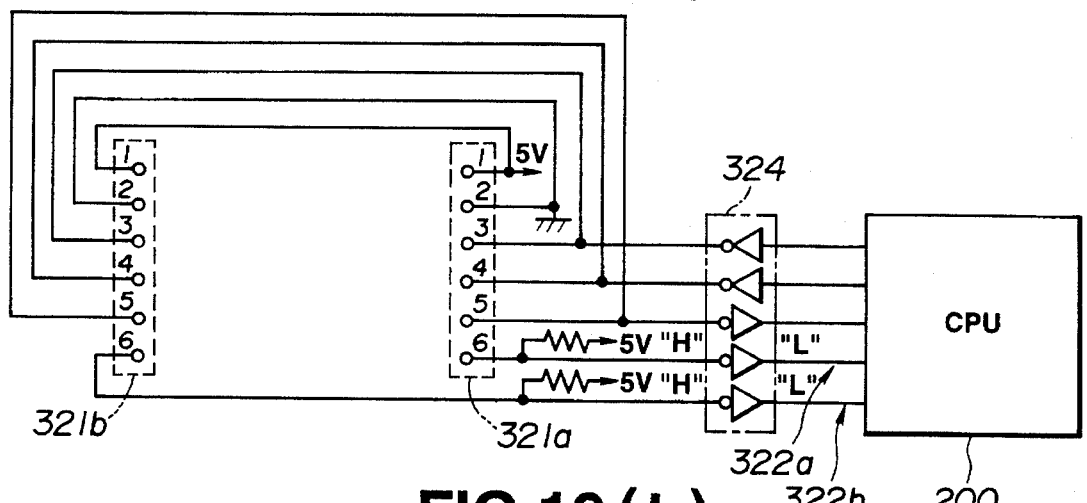
FIGS. 19(a) through 19(c) are circuit diagrams in the third embodiment.
Figure 19B:
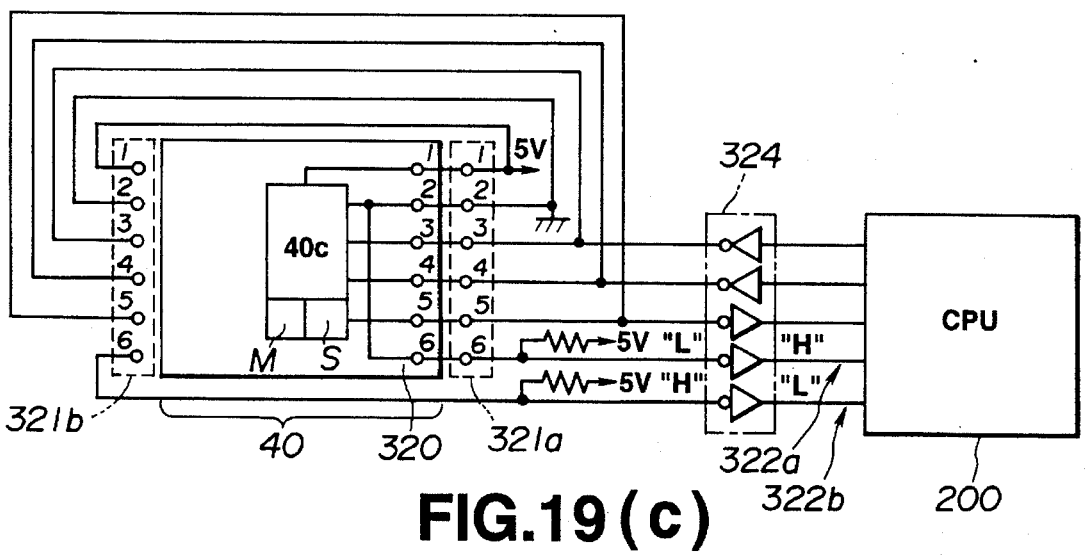
Figure 19C:
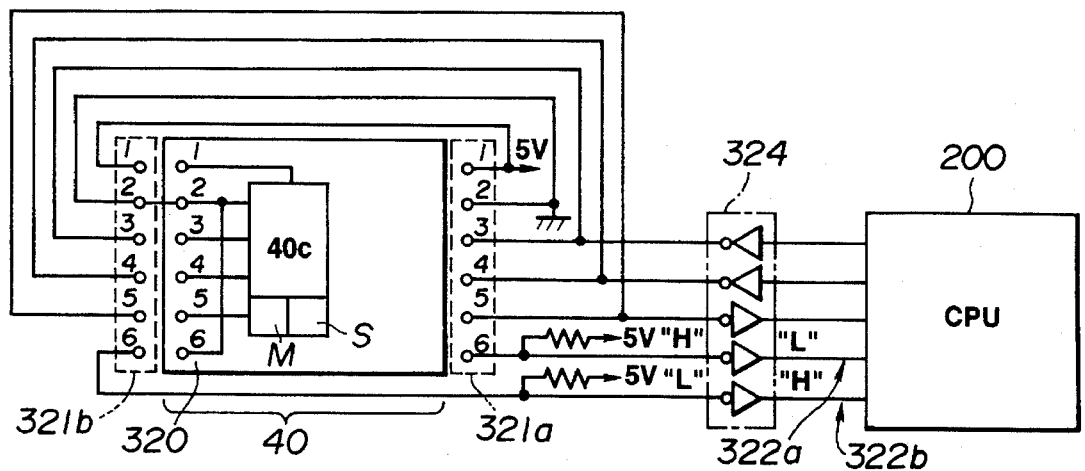

FIGS. 18 through 19(c) illustrate connection between a camera unit and the main body of the apparatus according to a third embodiment of the present invention.

In FIG. 18, a camera unit 40 is inserted along camera guides 42a and 42b. A contact portion 320 with the main body of the apparatus is provided on the camera unit 40, and two contact portions 321a and 321b with the camera unit 40 are provided on the camera guides 42a and 42b of the main body of the apparatus, respectively. When the camera unit 40 is inserted in a photographing state on channel A as shown in FIG. 18, the contact portion 320 of the camera unit 40 is connected to the contact portion 321a of the camera guide 42a. When the camera unit 40 is inserted in a photographing state on channel B by being made to be in an upside-down state, the contact portion 320 of the camera unit 40 is connected to the contact portion 321b of the camera guide 42b.

FIGS. 19(a), 19(b) and 19(c) illustrate connection circuits between the camera unit 40 and the main body of the apparatus represented by signals 322a and 322b to the CPU 200, in a state in which the camera unit 40 is not inserted, in a state in which a photographing operation on channel A is performed, and in a state in which a photographing operation on channel B is performed, respectively.

Terminal 6 of each of the camera-guide contact portions 321a and 321b is connected to a power supply (5 V) via a resistor, and terminal 2 of each of the contact portions 321a and 321b is connected to ground. Terminals 2 and 6 of the contact portion 320 of the camera unit 40 are connected within the camera unit 40. Other terminals are connected to a camera circuit 40c within the camera unit 40. Terminals 3, 4 and 5 are used for performing information communication between the camera unit 40 and the main body (CPU 200) of the apparatus.

As shown in FIG. 18, a display device D for displaying information relating to the film, such as the remaining amount of the film on a reciprocating photographing region, a channel on which images can be photographed, and the like, so as to be observable from the outside is provided on a side of a film-accommodating case of the camera unit 40. The camera circuit 40c within the case includes a semiconductor memory M, the display device D, a power supply S, serving as a backup power supply for the memory M, and a driving circuit for driving respective components within the camera unit 40.

When the camera unit 40 is mounted in the main body of the apparatus, the display device D, the camera circuit 40c, the memory M and the driving circuit are electrically connected to the CPU 200 of the main body of the apparatus, and electrical signals are exchanged between the respective components of the camera unit 40 and the CPU 200. The remaining (photographable) amount of the film when starting a photographing operation is stored in advance in the memory M provided in the camera unit 40.

When the camera unit 40 is mounted in the main body of the apparatus, the remaining amount of the film stored in the memory M is transmitted to the CPU 200. The remaining amount of the film during the photographing operation is calculated in the main body of the apparatus, the calculated remaining amount of film is displayed on the display device D, and the remaining amount of the Film stored in the memory M is updated.

When the camera unit 40 has been taken out from the main body of the apparatus after completing the photographing operation, the remaining amount of the film remains to be displayed on the display device D because the memory M is backed up by the backup power supply S. The remaining amount of the film after completing the photographing operation is stored in the memory M. Hence, when the camera unit 40 is mounted again in the main body of the apparatus, the remaining amount of the film stored in the memory M is transmitted to the CPU 200, and the remaining amount of the film after starting a photographing operation can be calculated. An ECD (electrochromic display) or a liquid-crystal display is used as the display device D.

FIG. 19(a) illustrates a state in which the camera unit is not inserted. Since nothing is connected to the camera-guide contact portions 321a and 321b, these contact portions assume an "H" level, and the inputs 322a and 322b to the CPU 200 after passing through an inverting buffer 324 assume an "L" level.

FIG. 19(b) illustrates a state in which the camera unit 40 is inserted to perform a photographing operation on channel A. Since terminals 2 and 6 of the contact portion 320 of the camera unit 40 are connected within the camera unit 40, terminal 6 of the camera-guide contact portion 321a is connected to ground via terminal 2 of the contact portion 321a and therefore assumes an "L" level. Since the input 322a to the CPU 200 after passing through the inverting buffer 324 assumes an "H" level, the CPU 200 can determine that the camera unit 40 is inserted to perform a photographing operation on channel A. At that time, the input 322b to the CPU 200 remains to be an "L" level.

FIG. 19(c) illustrates a state in which the camera unit 40 is inserted to perform a photographing operation on channel B. Since terminals 2 and 6 of the contact portion 320 of the camera unit 40 are connected within the camera unit 40, terminal 6 of the camera-guide contact portion 321b is connected to ground via terminal 2 of the contact portion 321b and therefore assumes an "L" level. Since the input 322b to the CPU 200 after passing through the inverting buffer 324 assumes an "H" level, the CPU 200 can determine that the camera unit 40 is inserted to perform a photographing operation on channel B. At that time, the input 322a to the CPU 200 remains to be an "L" level.

As described above, according to the configuration shown in FIGS. 18 through 19(c), the direction of insertion (posture) of the camera unit 40 can be automatically determined, even if the camera unit 40 is inserted in an upside-down state, by a simple configuration of providing a single contact portion on the camera unit 40.

Fourth Embodiment

In a photographing apparatus in which a reciprocating (duo) photographing operation is performed on a microfilm by making the camera unit 40 in an upside-down state, a photographing operation cannot be performed correctly if the camera unit 40 is inserted in a wrong posture. A description will now be provided of a method of preventing such a misoperation.

Figure 20:
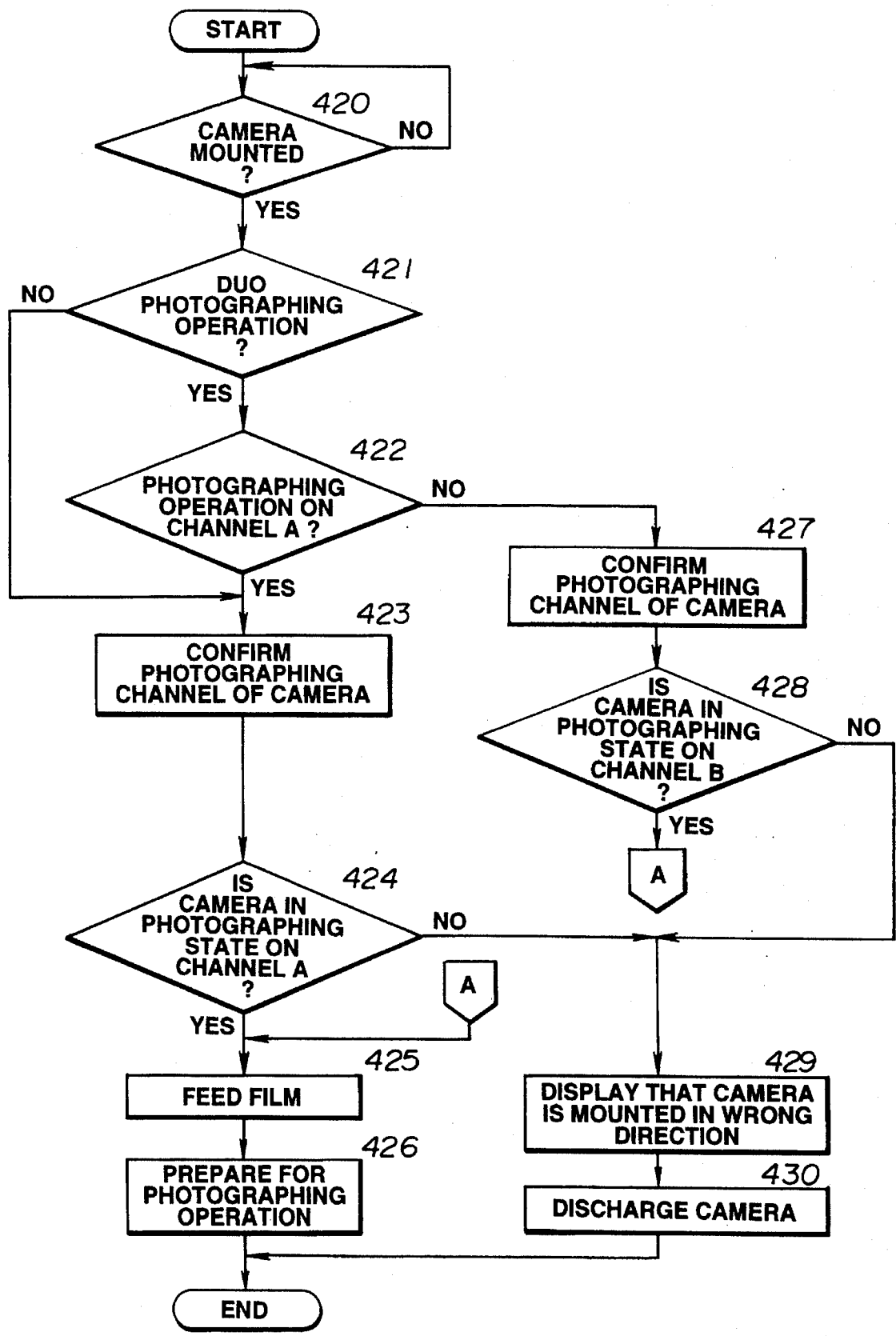
FIG. 20 is a flowchart illustrating processing in a fourth embodiment of the present invention.

FIG. 20 is a flowchart illustrating the processing of a fourth embodiment of the present invention.

In FIG. 20, first, it is detected that the camera unit 40 has been inserted in step 420. Thereafter, it is determined in step 421 if the camera unit 40 performs a reciprocating (duo) photographing operation. If the result of the determination is affirmative, it is determined in step 422 if images are to be photographed on channel A. If the result of the determination is affirmative, the process proceeds to step 423. If the result of the determination in step 421 is negative, the process also proceeds to step 423. By confirming the position of the above-described camera-unit contact portion in step 423, it is determined if the camera unit 40 is inserted in a state of performing a photographing operation on channel A (step 424). If the result of the determination in step 424 is affirmative, the film is fed (step 425), and a photographing operation is prepared for (step 426). If the result of the determination in step 424 is negative, a display indicating that the camera unit 40 is mounted in a wrong posture and therefore a photographing operation cannot be performed is performed in step 429, and the camera unit 40 is discharged (step 430).

If the result of the determination in step 422 is negative, the process proceeds to step 427. By confirming the position of the camera-unit contact portion in step 427, it is determined if the camera unit 40 is inserted in a state of performing a photographing operation on channel B (step 428). If the result of the determination is affirmative, the process proceeds to steps 425 and 428. If the result of the determination is negative, the process proceeds to steps 429 and 430 because the camera unit 40 is mounted in a wrong posture.

As described above, in a photographing apparatus in which a reciprocating (duo) photographing operation is performed on a microfilm by making the camera unit in an upside-down state, a warning is displayed when the camera unit is inserted in a wrong posture and the camera unit is automatically discharged, so that a correct photographing operation can always be performed.

Fifth Embodiment

Figure 21:
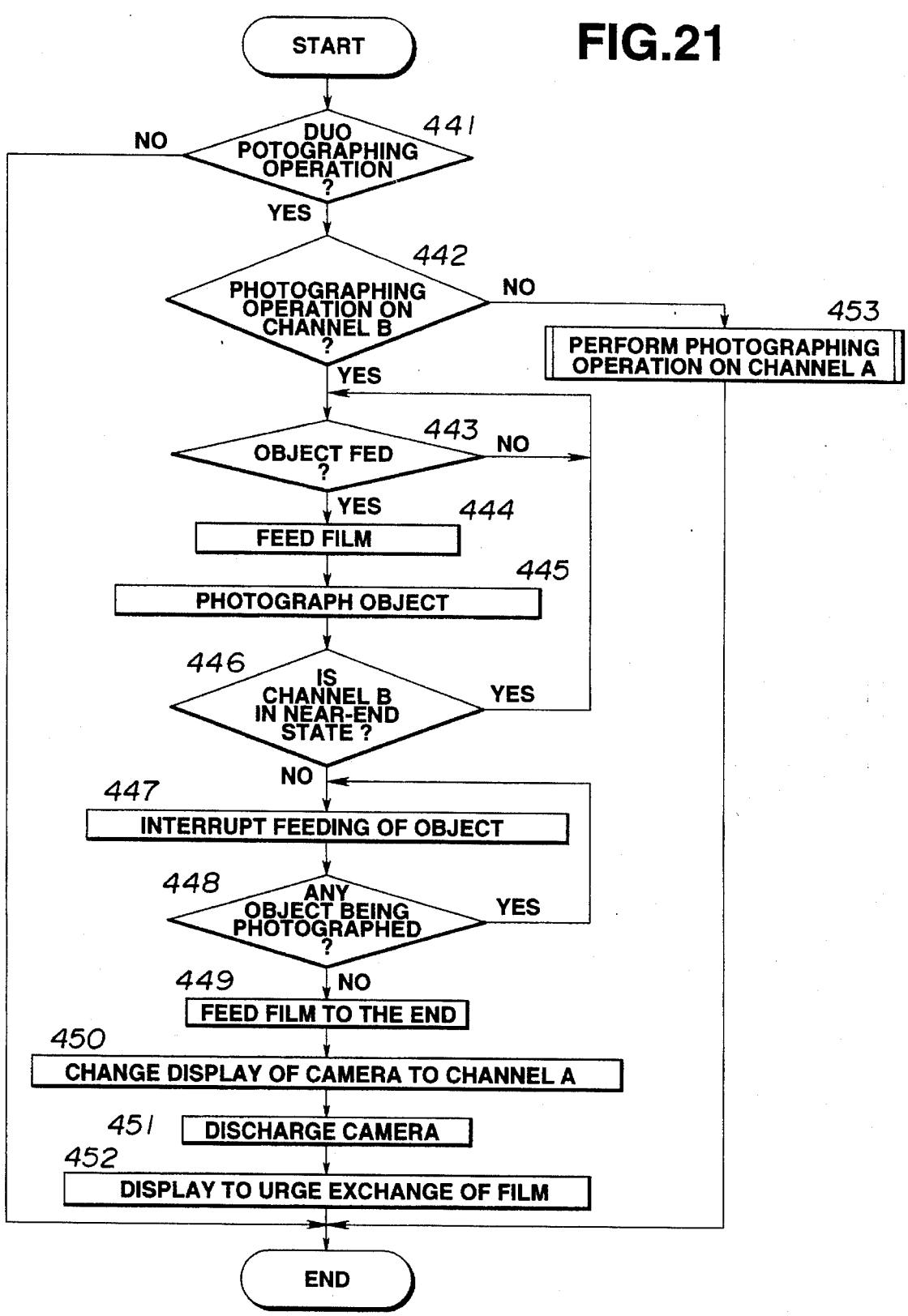
FIG. 21 is a flowchart illustrating processing in a fifth embodiment of the present invention.

In a photographing apparatus in which a reciprocating (duo) photographing operation is performed on a microfilm by making the camera unit 40 in an upside-down state, the film is completely wound after terminating a photographing operation on channel B, whereby the entire photographing operation is completed. The camera unit after completing the photographing operation starts again a photographing operation on channel A after exchanging the film. A description will now be provided of the state of a camera-unit display at that time with reference to the flowchart shown in FIG. 21.

First, it is determined in step 441 if the camera unit 40 performs a duo photographing operation. If the result of the determination is negative, the processing of this flowchart is not performed. If the result of the determination is affirmative, it is determined if the photographing operation is performed on channel B (step 442). If the result of the determination is negative, a photographing operation on channel A is performed (step 453). If the result of the determination is affirmative, it is awaited until an object to be photographed is fed (step 443). When the object has been fed, the film is fed (step 444) and the object is photographed (step 445), and it is awaited until an object image comes to a trailing-edge portion of the film (until channel B becomes in a near-end state) (step 446). When channel B has become in a near-end state, feeding of the next object is interrupted (step 447), and it is awaited until there is no object being photographed (step 448), and the film is fed to the end and wound in step 449. Thereafter, the display of the camera unit 40 is returned to channel A as shown in FIG. 24 (step 450), the camera unit 40 is discharged (step 451), and a display to urge to replace the film with a new film is performed in step 452.

Figure 22:
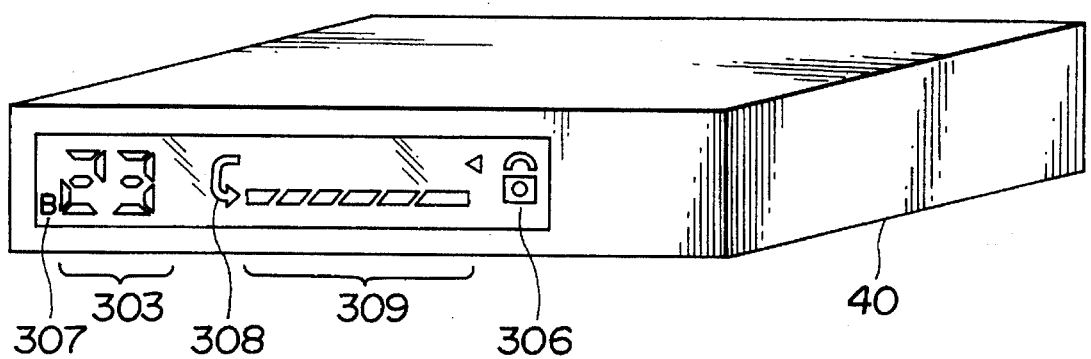
FIG. 22 illustrates a camera unit during a photographing operation on channel B in the fifth embodiment.
Figure 23:
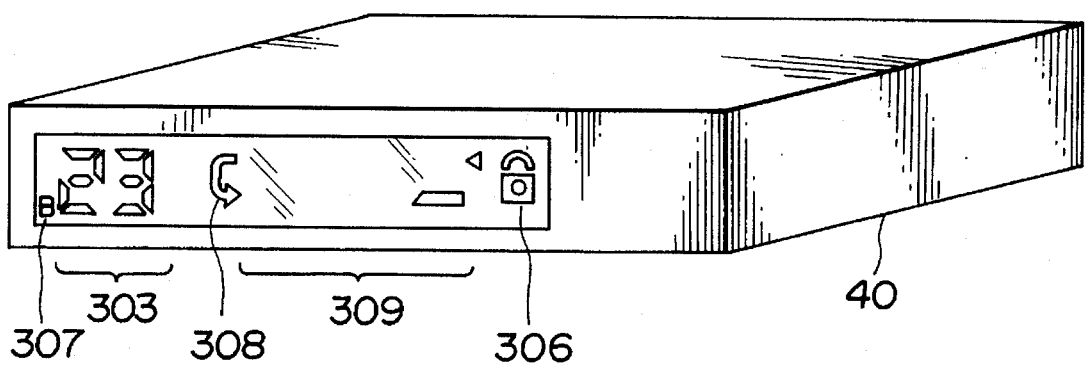
FIG. 23 illustrates the camera unit after the photographing operation on channel B in the fifth embodiment.
Figure 24:
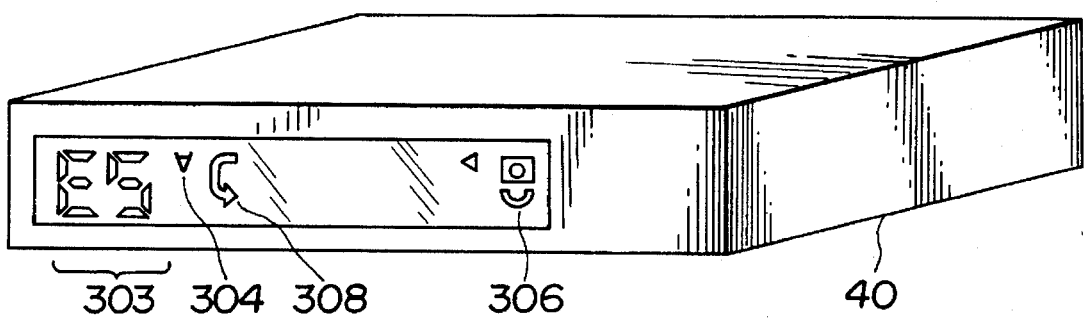
FIG. 24 illustrates the camera unit after a photographing operation has been terminated in the fifth embodiment.
Figure 25:
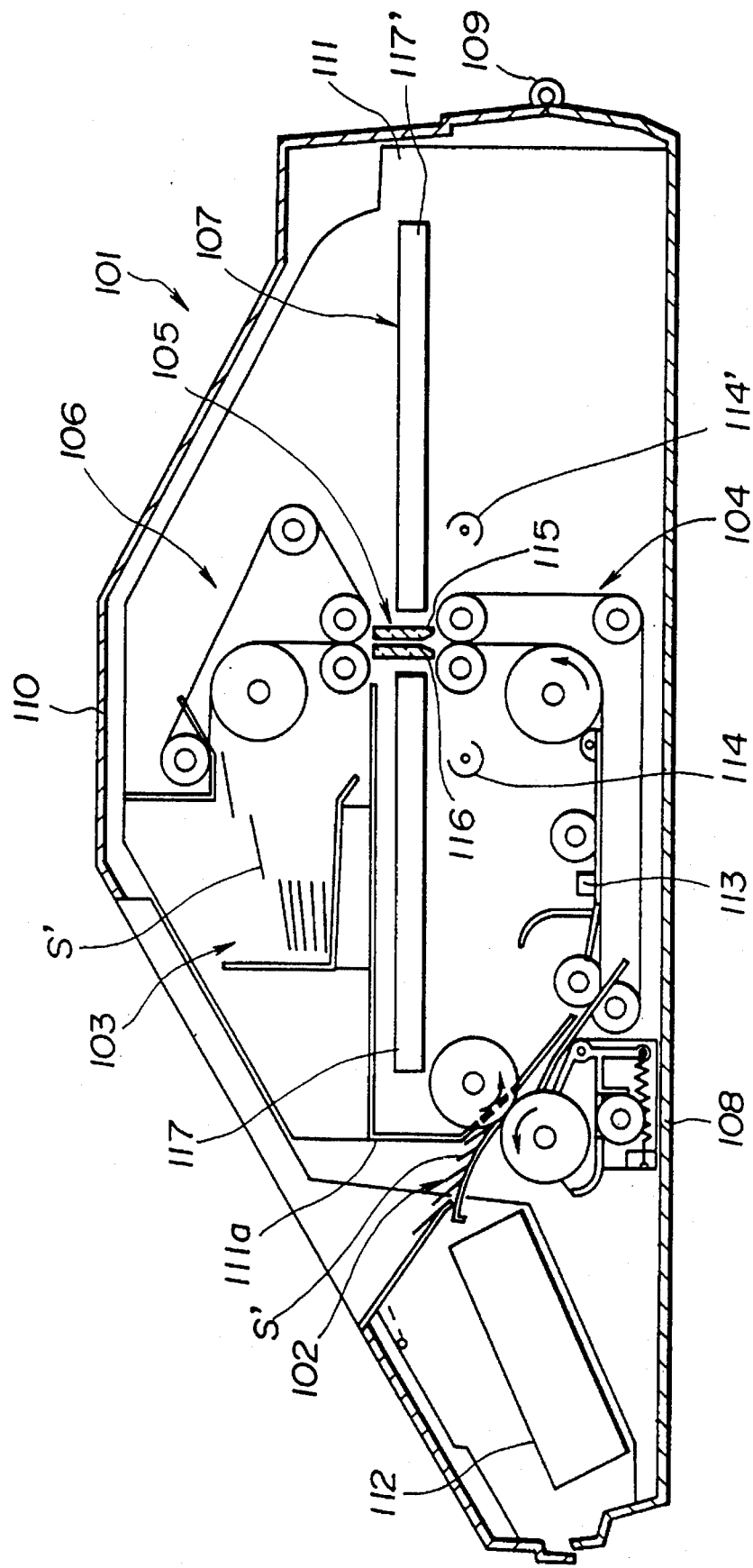
Figure 26:
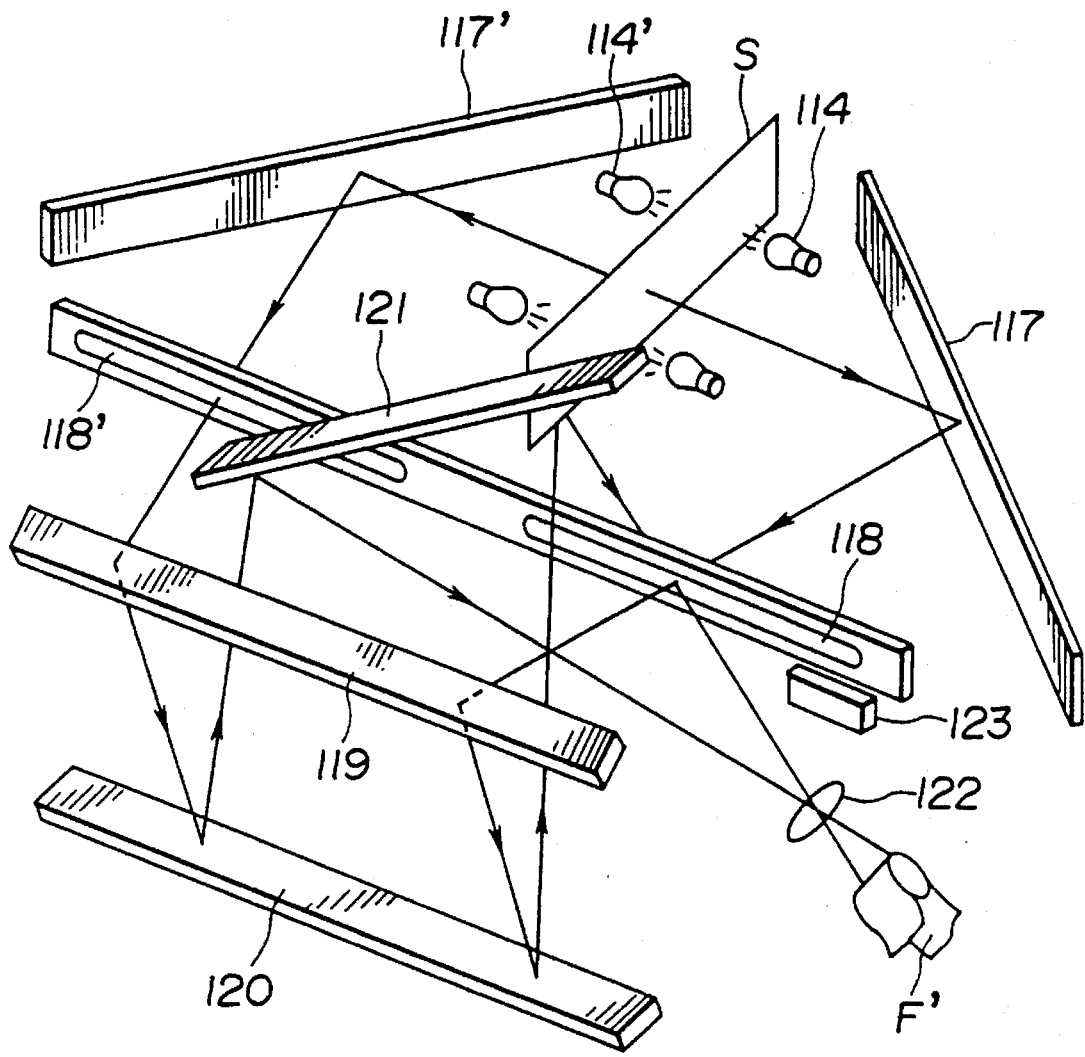
FIG. 26 illustrates the configuration of an optical system used in the camera shown in FIG. 25.
Figure 28:
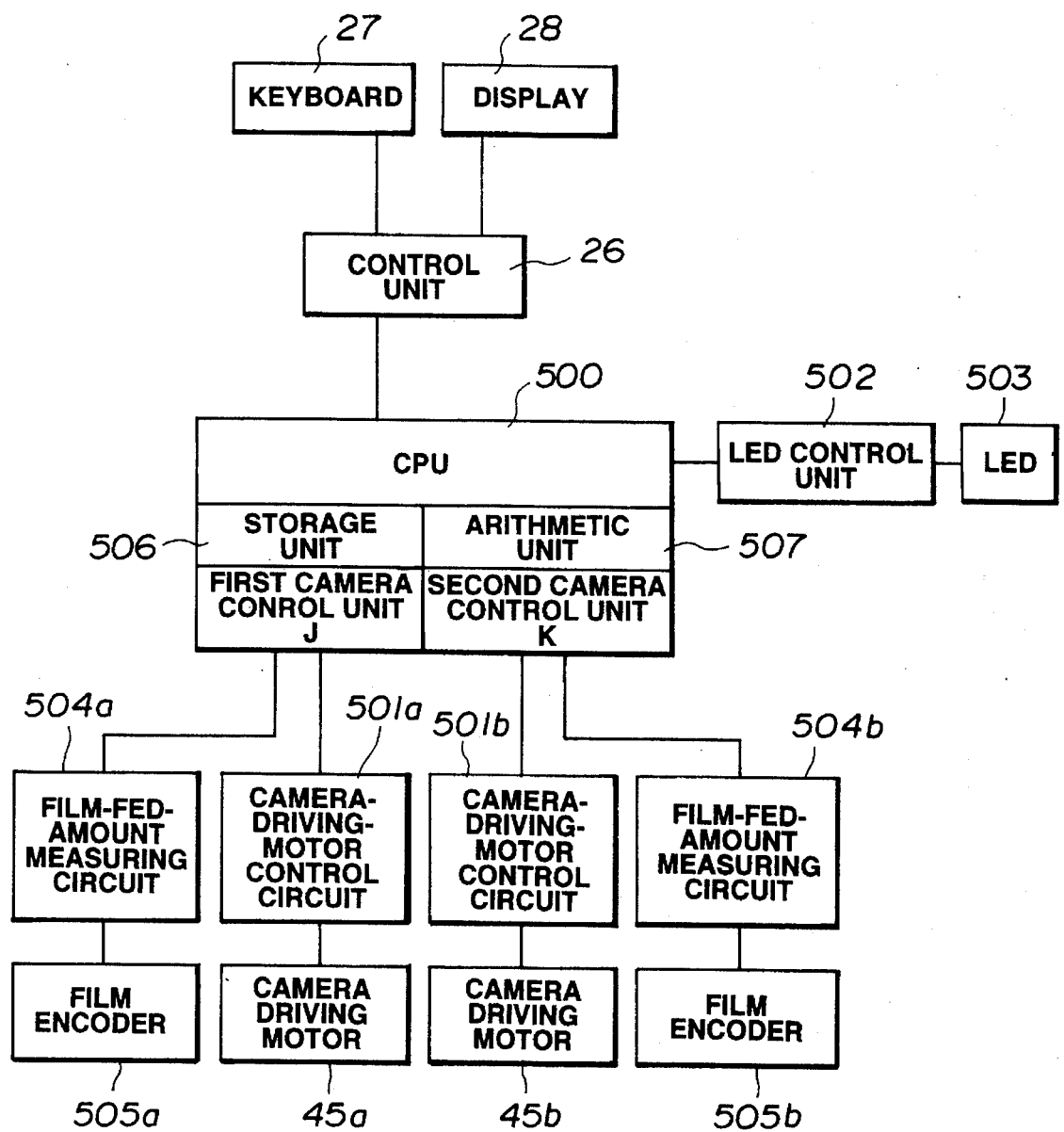
FIG. 28 illustrates an example of a conventional rotary type camera.

FIGS. 22 through 24 illustrate the camera-unit display in the fifth embodiment. FIG. 22 illustrates the camera unit during a photographing operation on channel B. As the photographing operation proceeds, the remaining amount (309) of the film for channel B decreases. When the object image reaches a position in the vicinity of the trailing edge of the film on channel B as shown in FIG. 28, the photographing operation cannot be further performed. Upon completion of the photographing operation, the display of the camera unit is returned to channel A (304) as shown in FIG. 24, and the camera unit is automatically discharged by the camera discharging mechanism.

As described above, in a microfilm photographing apparatus in which a duo photographing operation is performed by making a camera unit in an upside-down state, by automatically discharging the camera unit and returning the display of the camera unit to channel A when a photographing operation on channel B has been completed, it is possible to clearly know the state of the camera unit and the direction of insertion of the camera unit for a subsequent photographing operation, and to correctly perform the subsequent photographing operation.

According to the present invention having the above-described configuration and functions, in a photographing apparatus including image-information photographing means capable of performing a reciprocating (duo) photographing operation of image information on a long recording medium, recording unit mounting/detaching means for mounting/detaching a recording unit accommodating the long recording medium relative to a main body of the photographing apparatus, and recording-unit display means for indicating a state of the recording unit, by automatically detaching the recording unit when the remaining amount of the long recording medium becomes small during a photographing operation on one of channels, and switching the display of the recording unit to another channel, it is possible to clearly know the direction of insertion of the recording unit and to prevent the recording unit from being mounted in a wrong posture in the vertical direction.

By displaying the remaining photographable amount of the long recording medium using a U-shaped figure, it is possible to display a one-way photographing operation or a reciprocating photographing operation. In addition, since the remaining amount of the recording medium is displayed using the U-shaped figure, it is possible to confirm at a glance that a reciprocating (duo) photographing operation is currently performed.

Even if the recording unit is mounted in a wrong posture in the vertical direction, by providing separate contact portions between the recording unit and the photographing apparatus for two postures in the vertical direction, the direction of the mounted recording unit can be detected by a simple configuration. Furthermore, by providing a warning display indicating the wrong posture and discharging the camera unit (recording unit), a photographing operation on a wrong channel in the wrong posture can be prevented.

By providing a display device in which the remaining photographable amount of the film is displayed on two stages for the forward direction and the reverse direction, and both a one-way photographing operation and a reciprocating photographing operation can be displayed according to the state of the display on one stage, it is possible to assuredly confirm the remaining photographable amount of the film and whether the current photographing operation is in the forward direction or in the reverse direction.

By providing a display device on the camera unit, it is possible to assuredly confirm the remaining photographable amount of the film in the camera unit and whether the photographing operation is performed in the forward direction or the reverse direction, even if the camera unit is detached from the main body of the apparatus.

By providing a photographing lens in the camera unit, it is possible to perform a photographing operation by the lens of the camera unit itself and to fix the magnification on the same film.

By automatically detaching the camera unit from the main body of the photographing apparatus and switching the display on the camera unit to a photographing operation in the opposite direction when the remaining photographable amount of the film becomes small, it is possible to clearly know that the remaining photographable amount of the film becomes small, and to mount the camera unit in a correct posture in the vertical direction when detaching it from the main body of the apparatus and again inserting it thereinto.

Sixth Embodiment

Figure 27:
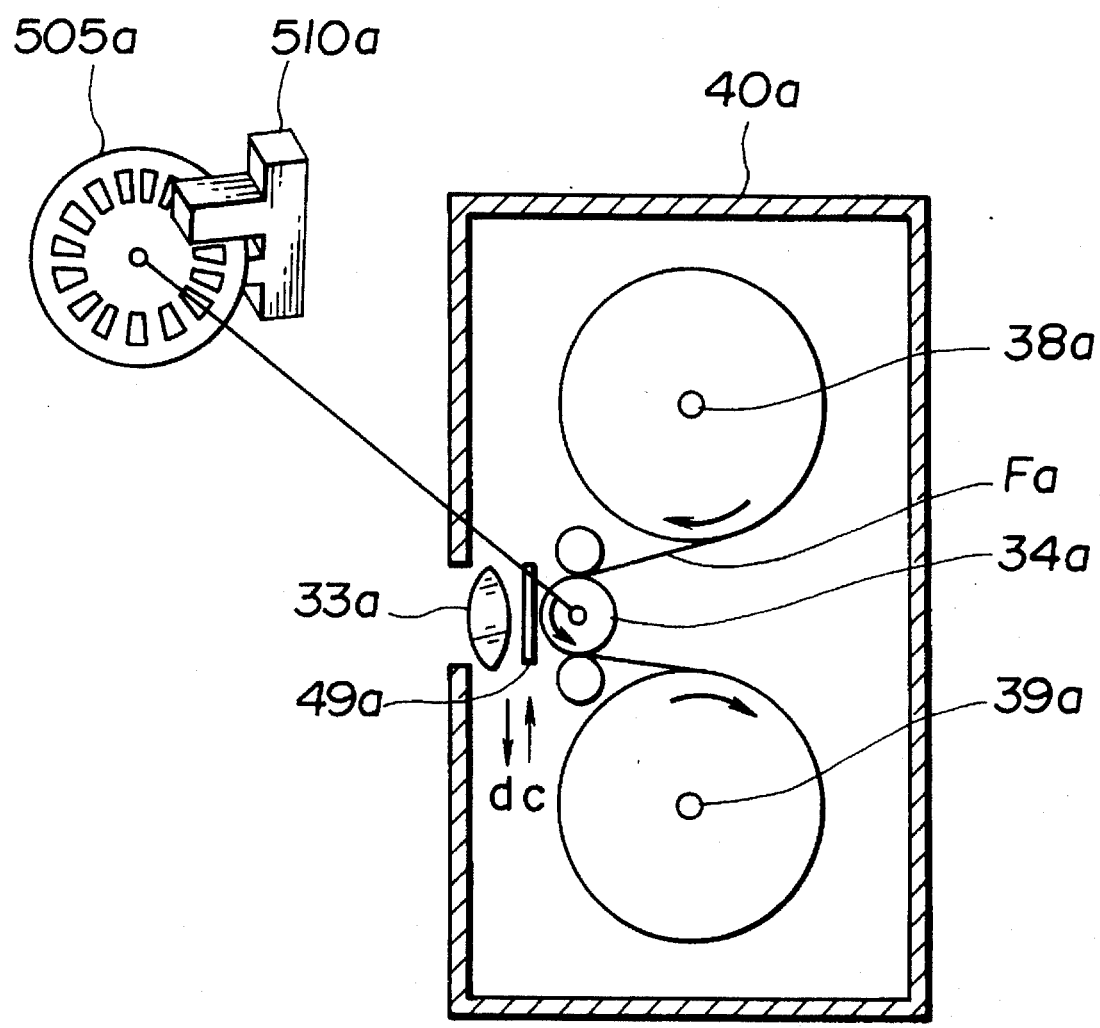
FIG. 27 is a schematic cross-sectional view of a camera unit according to a sixth embodiment of the present invention.

FIG. 27 illustrates a camera unit according to a sixth embodiment of the present invention.

In FIG. 27, a capstan roller 34a is connected to a film encoder 505a, serving as measuring means for measuring the fed amount of a film. Pulses in proportion to the fed amount of the film are generated from a sensor 510a.

FIG. 28 is a block diagram of a control circuit for operating the photographing apparatus 1 shown in FIG. 1 according to the sixth embodiment. In FIG. 28, a control unit 26 including a keyboard 27 and a display 28 is connected to a CPU 500 within the photographing apparatus 1. A first camera control unit J and a second camera control unit K of the CPU 500 are connected to camera driving motors 45a and 45b via camera-driving-motor control circuits 501a and 501b, respectively. The CPU 500 is connected to an LED for marking 503 via an LED control circuit 502. Film-fed-amount measuring circuits 504a and 504b are connected to the CPU 500, and film encoders 505a and 505b connected to capstan rollers 34a and 34b are connected to the film-fed-amount measuring circuits 504a and 504b, respectively. The CPU 500 also incorporates a storage unit 506 for storing the fed amount of the film and the like, and an arithmetic unit 507 for calculating the fed amount of the film.

In the sixth embodiment having the above-described configuration, in which a reciprocating (duo) photographing operation is performed, a photographing operation of object images on channel A of the film has been completed, and a photographing operation on channel B is being performed after inverting the film in the direction of the width. At that time, as shown, for example, in FIG. 7, images have been photographed on the entire region of channel A of the film, and images have been photographed up to a midpoint of channel B.

In the sixth embodiment, during the reciprocating photographing operation of images on the long microfilm, the photographing operation is terminated when the photographing operation on channel B is not completed.

Figure 29A:
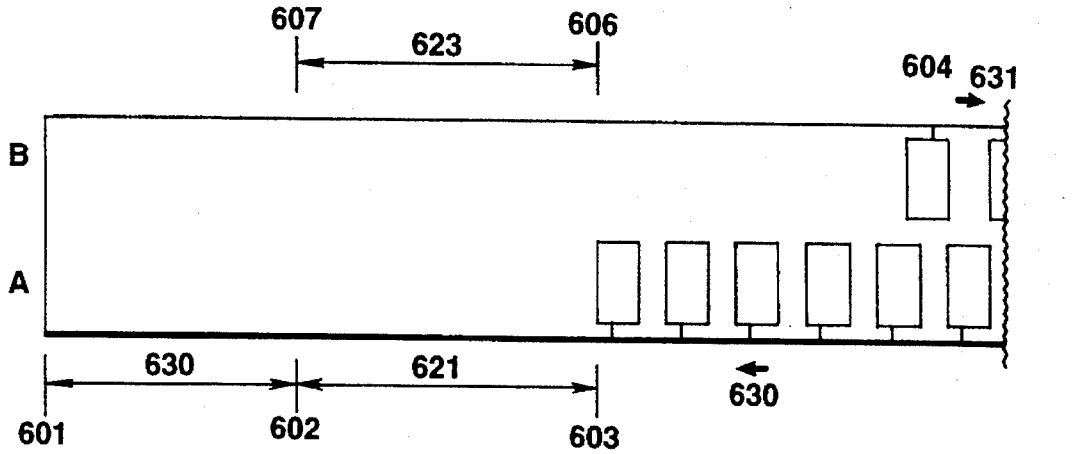
FIGS. 29(a) and 29(b) illustrate a duo film in the sixth embodiment.
Figure 29B:
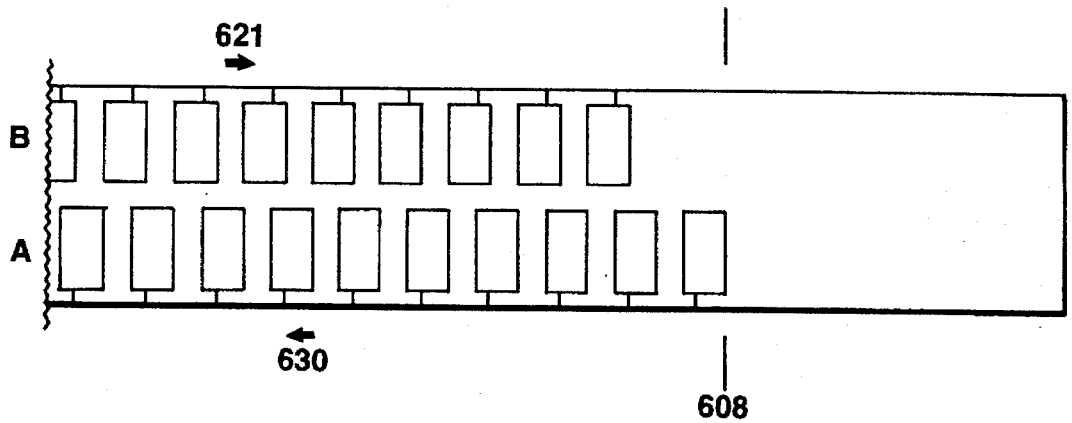

FIGS. 29(a) and 29(b) illustrate a leading-edge portion and a trailing-edge portion of the film, respectively, in the sixth embodiment. First, the film is mounted in the photographing apparatus 1 after taking out the leading edge 601 of the film from a supply reel 38a and winding a leading-edge portion 620 of the film around a takeup reel 39a. As shown in FIG. 29(a), the photographing apparatus 1 performs leader feeding of a film portion 621, which may already have been exposed to external light, from a position 602 to a position 603. This position is stored as a position to start a photographing operation where the fed amount of the film equals 0. A photographing operation of images on channel A is started from this point 603, serving as a reference position. Images are sequentially photographed while feeding the film in the direction of an arrow 630. The fed amount of the film increases as 0→1→2→3→as a result of calculating the fed amount of the film based on signals from the film encoder 505a. When the photographed image has reached a position 608 in the vicinity of the trailing edge of the film shown in FIG. 29(*b*), the photographing operation on channel A is terminated, the film is inverted, and the photographing operation is switched to channel B. At that time, the fed amount of the film on channel A has increased to 127.

In FIG. 29(*b*) of the sixth embodiment, when the photographing operation is switched to channel B, the direction of film feeding is changed to the direction of an arrow 631 shown in FIG. 29(*a*), and the fed amount of the film is made to be 0 at this point. While images are sequentially photographed by feeding the film, the fed amount of the film is calculated and added as 0→1→2→3→based on signals from the film encoder 505. If there remains no more objects to be photographed when the photographing operation on channel B has reached a position 604, the photographing operation is terminated. However, if the film is taken out in this state, portions of photographed images are exposed to external light. Accordingly, when terminating the photographing operation, the film is fed until the accumulated fed amount of the film reaches the value equal to the fed amount 127 of the film on channel A, i.e., the film is fed up to a position 606 on channel B which equals the position 603 on channel A where the photographing operation on channel A has started. By performing trailer feeding by an amount 623 from the position 606 as in the leader feeding on channel A, the film is fed up to a position 607, where photographed images are not exposed to external light, without winding the film to the end, whereby the entire operation is completed.

Figure 30:
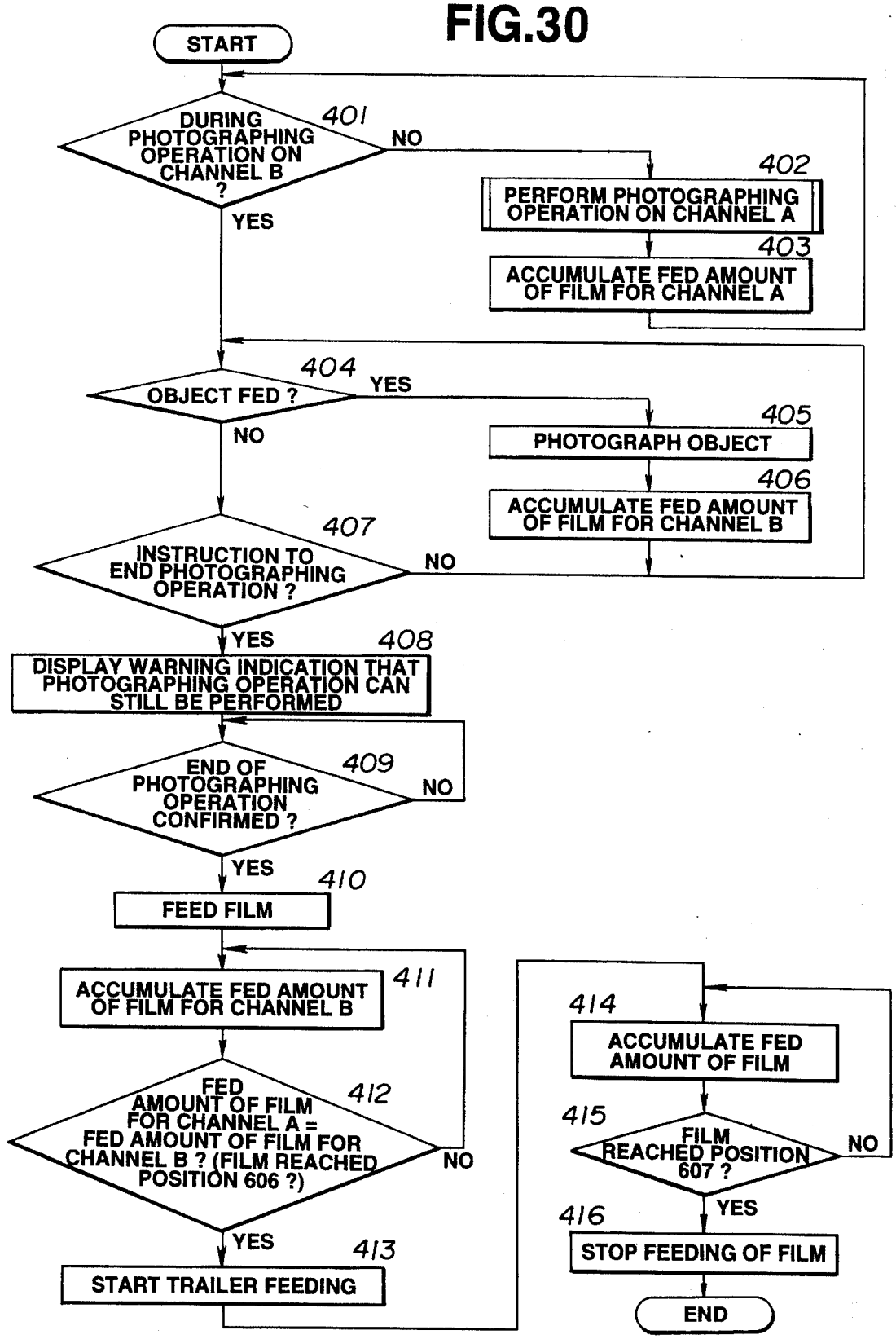
FIG. 30 is a flowchart illustrating the processing in the sixth embodiment.

A series of operations described above will be explained with reference to the flowchart shown in FIG. 30.

First, if the result of the determination in step 401 indicates a photographing operation on channel A, the photographing operation on channel A is continued in step 402, and the fed amount of the film for channel A is accumulated (step 403). If the result of determination in step 401 indicates a photographing operation on channel B, and the result of determination in step 404 indicates that an object to be photographed has been fed, the object is photographed in step 405. Since the film has also been fed, the fed amount of the film for channel B is accumulated in step 406. If an instruction to terminate the photographing operation is provided in step 407 during the photographing operation on channel B, a warning indicating that the photographing operation can still be performed is displayed on the control unit 26 (step 408). If the instruction to terminate the photographing operation is provided again in step 409 in spite of this warning display, feeding of the film is started in step 410, and the accumulation of the fed amount of the film on channel B is continued based on signals from the film encoder 505b (step 411). If the result of the accumulation indicates in step 412 that the fed amount of the film for channel A equals the fed amount of the film for channel B (i.e., the film reached the position 606), the feeding of the film is stopped, and trailer feeding is started in step 413. If the result of the accumulation of the fed amount of the film in the trailer feeding in step 414 indicates that the film has reached the position 607, the feeding of the film is stopped in step 418, and the photographing operation is terminated. As a result, the photographing operation is terminated in a state in which the portion 620 of the film, which has been wound around the takeup Feel 39a, remains on the supply reel 38a.

As described above, in the sixth embodiment, when performing a reciprocating photographing operation of images on a microfilm, the position to start a photographing operation of images on channel A is first stored, and trailer feeding is performed after assuredly feeding the film up to the position to start the photographing operation of images on channel A, even when the photographing operation is terminated during a photographing operation on channel B, by accumulating the fed amount of the film. Accordingly, a reciprocating photographing operation can be performed without exposing photographed images to external light and performing unnecessary film feeding.

Seventh Embodiment

In a seventh embodiment of the present invention, during a reciprocating photographing operation of images on a long microfilm, the photographing operation is terminated when a photographing operation on channel B comes close to the end.

Figure 31A:
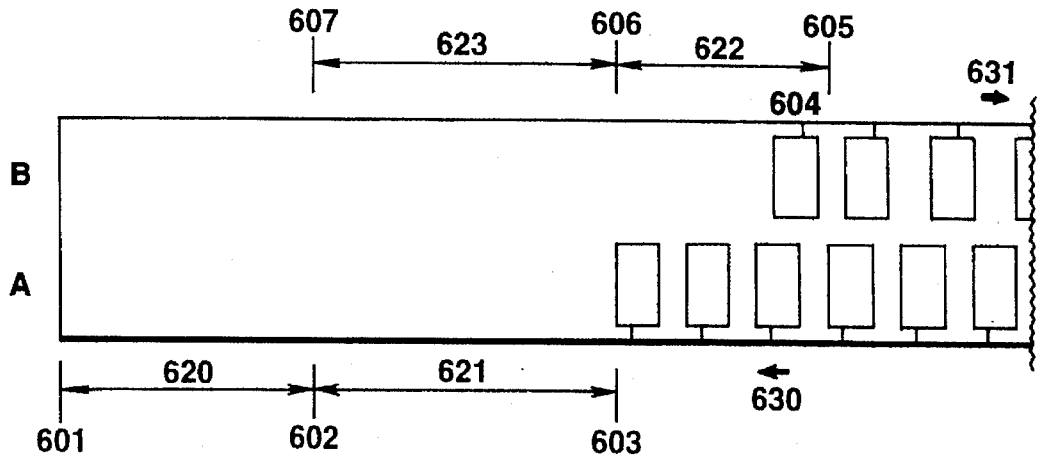
FIGS. 31(a) and 31(b) illustrate a duo film in a seventh embodiment of the present invention.
Figure 31B:
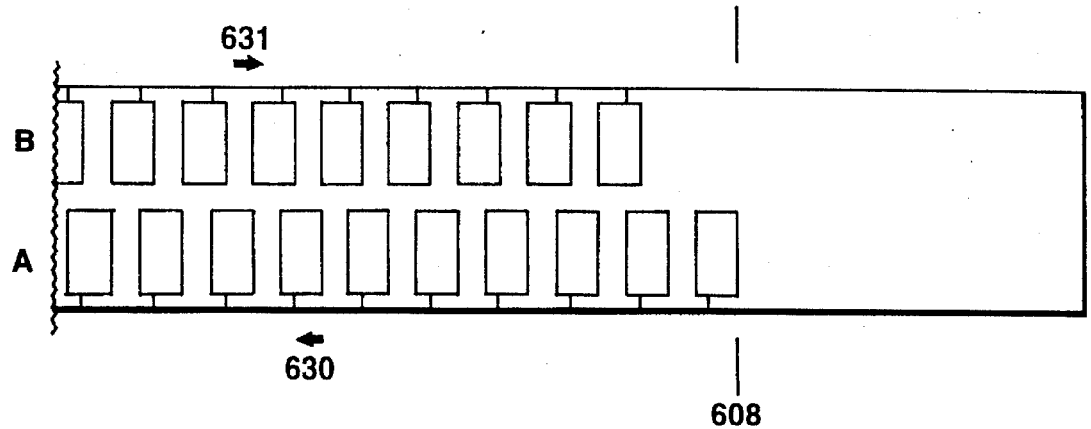

FIGS. 31(*a*) and 31(*b*) illustrate a leading-edge portion and a trailing-edge portion of the film, respectively, in the seventh embodiment. As in the sixth embodiment, first, the film is mounted in the photographing apparatus 1 after taking out the leading edge 601 of the film from a supply reel 38a and winding a leading-edge portion 620 of the film around a takeup reel 39a. As shown in FIG. 31(*a*), the photographing apparatus 1 performs leader feeding of a film portion 621, which may already have been exposed to external light, from a position 602 to a position 603. This position is made to be a position to start a photographing operation where the fed amount of the film equals 0. A photographing operation of images on channel A is started from this point 603, serving as a reference position. Images are sequentially photographed while feeding the film in the direction of an arrow 630. The fed amount of the film increases as 0→ 1→2→3→as a result of calculating the fed amount of the film based on signals from the film encoder 505a. When the photographed image has reached a position 608 in the vicinity of the trailing edge of the film shown in FIG. 31(*b*), the photographing operation on channel A is terminated, the film is inverted, and the photographing operation is switched to channel B. At that time, the fed amount of the film on channel A has increased to 127.

In FIG. 31(*b*), when the photographing operation is switched to channel B, the direction of film feeding is changed to the direction of an arrow 631 shown in FIG. 31(*a*), and the fed amount of the film is made to be 0 at this point. While images are sequentially photographed by feeding the film, the fed amount of the film is calculated and added as 0→1→2→3→based on signals from the film encoder 505. When the photographing operation on channel B has reached a position 605, the remaining photographing amount of the film equals only a portion 622. This position is termed a near end of channel B in the seventh embodiment. When the photographing operation on channel B reaches a position 604, the fed amount of the film reaches 125. This position corresponds to the near end of channel B, and the photographing operation will become impossible very soon. Hence, a near-end warning is provided when a photographed image has passed through the position 605. If there remains no object to be photographed in this state, an instruction to terminate the photographing operation is provided. The subsequent operation is the same as in the sixth embodiment. The entire photographing operation is completed after feeding the film to the position 607.

Figure 32:
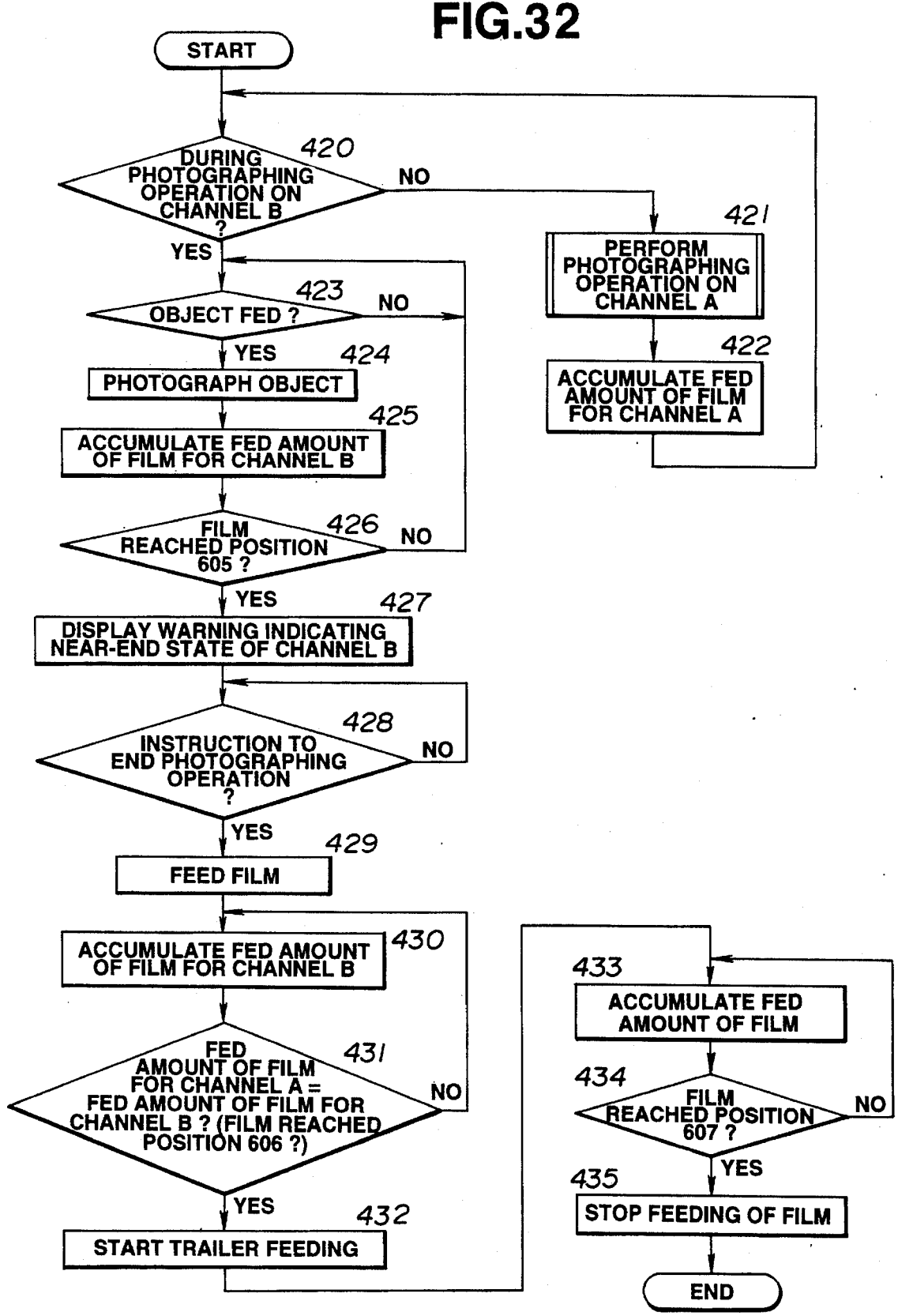
FIG. 32 is a flowchart illustrating the processing in the seventh embodiment.

A series of operations described above will be explained with reference to the flowchart shown in FIG. 32.

First, if the result of determination in step 420 indicates a photographing operation on channel A, the photographing operation on channel A is continued in step 421, and the fed amount of the film for channel A is accumulated (step 422).

If the result of determination in step 420 indicates a photographing operation on channel B, and the result of determination in step 423 indicates that an object to be photographed has been fed, the object is photographed in step 424. Since the film has also been fed, the fed amount of the film for channel B is accumulated in step 425. If the near end of channel B calculated from the fed amount of the film on channel A is in the vicinity of the position 605, it is determined in step 426 if the accumulated fed amount of the film has reached the position 605. If the result of the determination is affirmative, a warning indicating the near end of channel B is provided in step 427, and an instruction to terminate the photographic operation is awaited in step 428. Feeding of the film is started in step 429 according to the instruction to terminate the photographing operation, and the accumulation of the fed amount of the film for channel B is performed based on signals from the film encoder 505b (step 430). If the result of the accumulation indicates in step 431 that the fed amount of the film for channel A equals the fed amount of the film for channel B (i.e., the film reached the position 606), trailer feeding is started in step 432. If the result of the accumulation of the fed amount of the film in the trailer feeding in step 433 indicates that the film has reached the position 607, the feeding of the film is stopped in step 435, and the photographing operation is terminated.

As described above, in the seventh embodiment, by storing the position to start a photographing operation of images on channel A and accumulating the fed amount of the film, it is possible to exactly warn that the remaining photographable region of channel B is very small.

Eighth Embodiment

In an eighth embodiment of the present invention, during a reciprocating photographing operation of images on a long microfilm, the photographing operation is interrupted after a photographing operation on channel B has reached a near-end region of channel B.

Figure 33A:
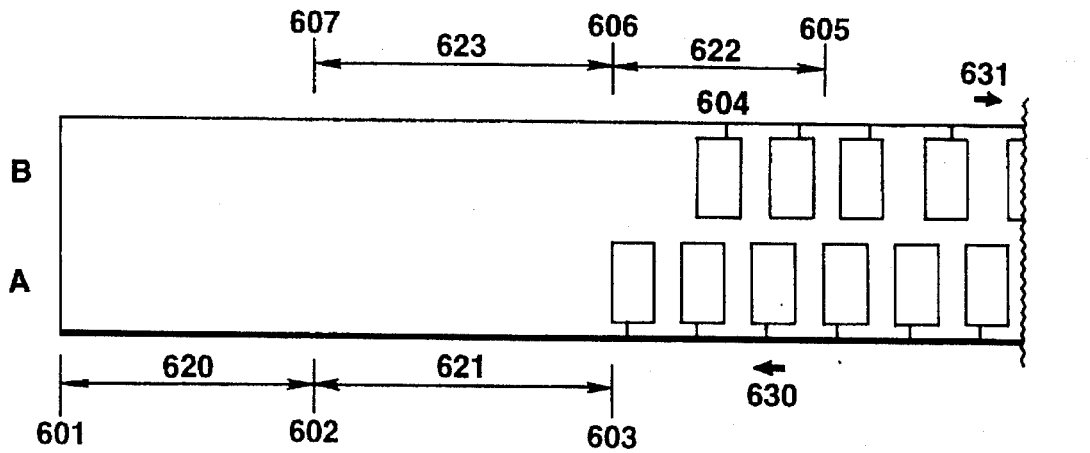
FIGS. 33(a) and 33(b) illustrate a duo film in an eighth embodiment of the present invention.
Figure 33B:
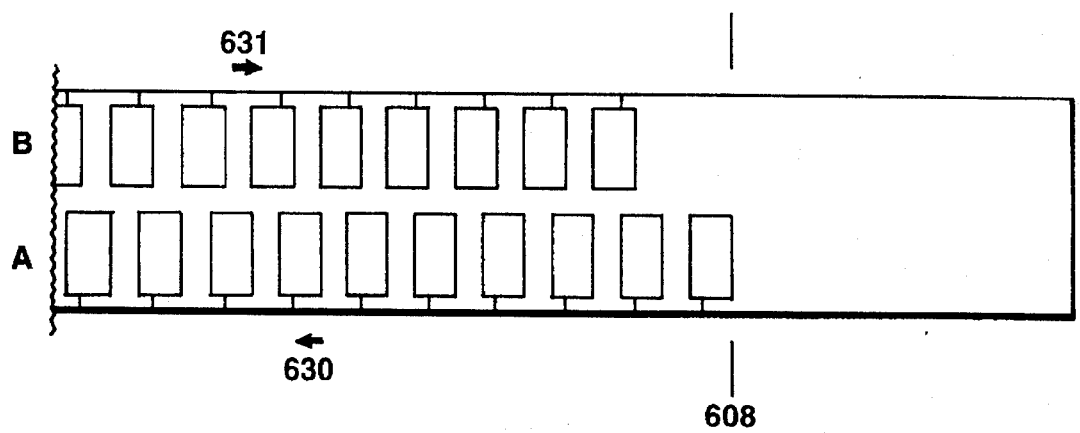

FIGS. 33(a) and 33(b) illustrate a leading-edge portion and a trailing-edge portion of the film, respectively, in the eighth embodiment. As in the sixth embodiment, first, the film is mounted in the photographing apparatus 1 after taking out the leading edge 601 of the film from a supply reel 38a and winding a leading-edge portion 620 of the film around a takeup reel 39a. As shown in FIG. 33(a), the photographing apparatus 1 performs leader feeding of a film portion 621, which may already have been exposed to external light, from a position 602 to a position 603. This position is made to be a position to start a photographing operation where the fed amount of the film equals 0. A photographing operation of images on channel A is started from this point 603, serving as a reference position. Images are sequentially photographed while feeding the film in the direction of an arrow 630. The fed amount of the film increases as 0→1→2→3→as a result of calculating the fed amount of the film based on signals from the film encoder 505a. When the photographed image has reached a position 608 in the vicinity of the trailing edge of the film shown in FIG. 33(b), the photographing operation on channel A is terminated, and the photographing operation is switched to channel B. At that time, the fed amount of the film on channel A has increased to 127.

In FIG. 33(b), when the photographing operation is switched to channel B, the direction of film feeding is changed to the direction of an arrow 631 shown in FIG. 33(a), and the fed amount of the film is made to be 0 at this point. While images are sequentially photographed by feeding the film, the fed amount of the film is calculated and added as 0→1→2→3→based on signals from the film encoder 505. When the photographing operation on channel B has reached a position 605 shown in FIG. 33(a), the film is at a near end of channel B and a warning indicating the near end is generated, but the photographing operation has proceeded to a position 604. If the feeding of the object is interrupted after the film has reached the near end of channel B, it is determined that the photographing operation will not proceed further, and the film is automatically fed to a position 606. As in the sixth embodiment, the entire photographing operation is completed after feeding the film to a position 607.

Figure 34:
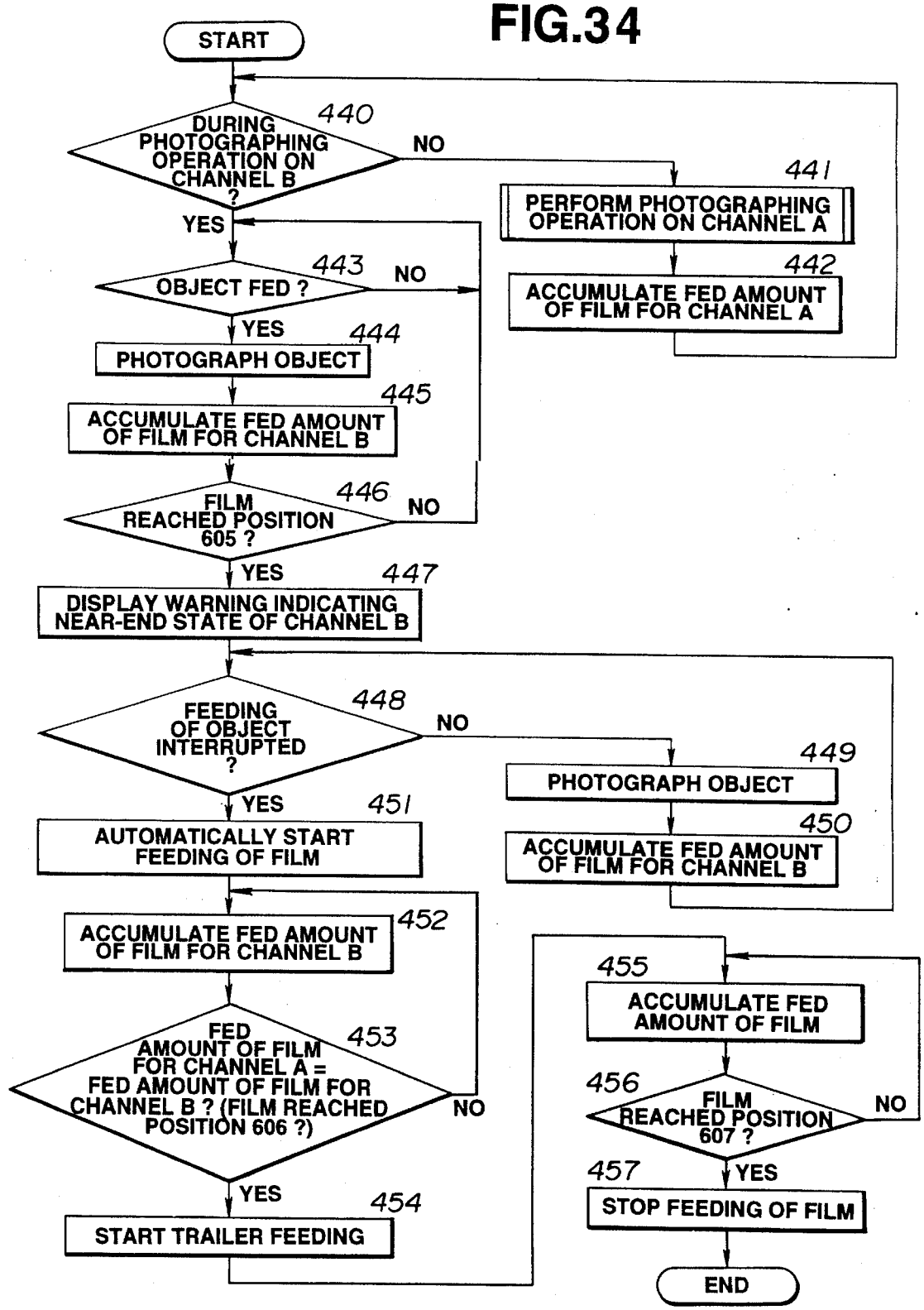
FIG. 34 is a flowchart illustrating the processing in the eighth embodiment.

A series of operations described above will be explained with reference to the flowchart shown in FIG. 34.

First, if the result of determination in step 440 indicates a photographing operation on channel A, the photographing operation on channel A is continued in step 441, and the fed amount of the film for channel A is accumulated (step 442). If the result of determination in step 440 indicates a photographing operation on channel B, and the result of determination in step 443 indicates that an object to be photographed has been fed, the object is photographed in step 444. Since the film has also been fed, the fed amount of the film for channel B is accumulated in step 445. If the near end of channel B calculated from the fed amount of the film on channel A is in the vicinity of the position 605, it is determined if the accumulated fed amount of the film has reached the position 605 (step 446). If the result of the determination is affirmative, a warning indicating the near end of channel B is provided in step 447, and interruption of the photographic operation is awaited in step 448. The photographing operation of objects is performed in step 449 until the photographing operation is interrupted. In step 450, the accumulation of the fed amount of the film by film feeding is continued. When the feeding of objects has been interrupted after the film has reached the near end, feeding of the film is automatically started in step 451, and the accumulation of the fed amount of the film on channel B is performed based on signals from the film encoder 505b (step 452). If the result of the accumulation indicates in step 453 that the fed amount of the film for channel A equals the fed amount of the film for channel B (i.e., the film reached the position 606), trailer feeding is started in step 454. If the result of the accumulation of the fed amount of the film in the trailer feeding in step 455 indicates that the film has reached the position 607 (step 456), the feeding of the film is stopped in step 457, and the photographing operation is terminated.

As described above, in the eighth embodiment, in a reciprocating photographing operation of images, if a photographing operation on channel B is interrupted when the film reaches a near-end region of channel B, the photographing operation is automatically terminated and feeding of the film is started.

Ninth Embodiment

In a ninth embodiment of the present invention, during a reciprocating photographing operation of images on a long microfilm, the position to start a photographing operation on channel A is stored, and the photographing operation is interrupted when a photographing operation on channel B has reached the starting position.

Figure 35A:
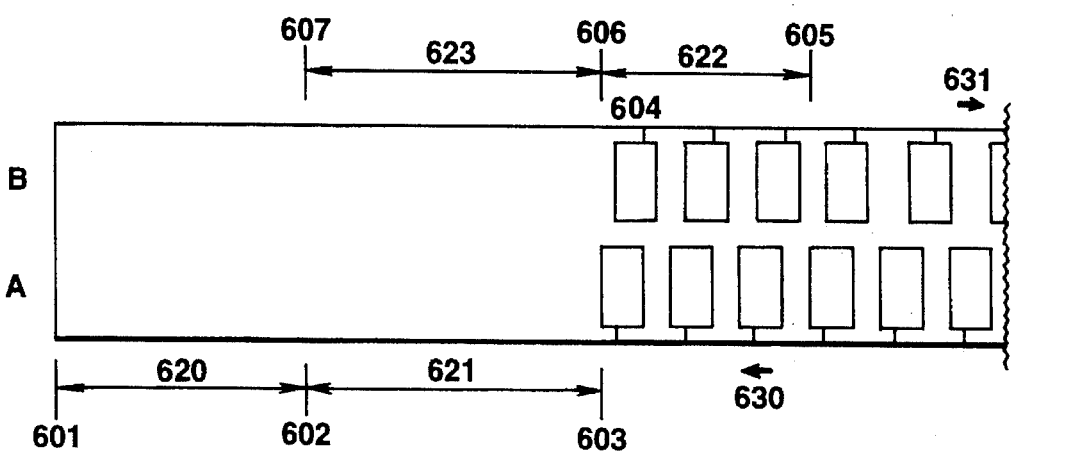
FIGS. 35(a) and 35(b) illustrate a duo film in a ninth embodiment of the present invention.
Figure 35B:
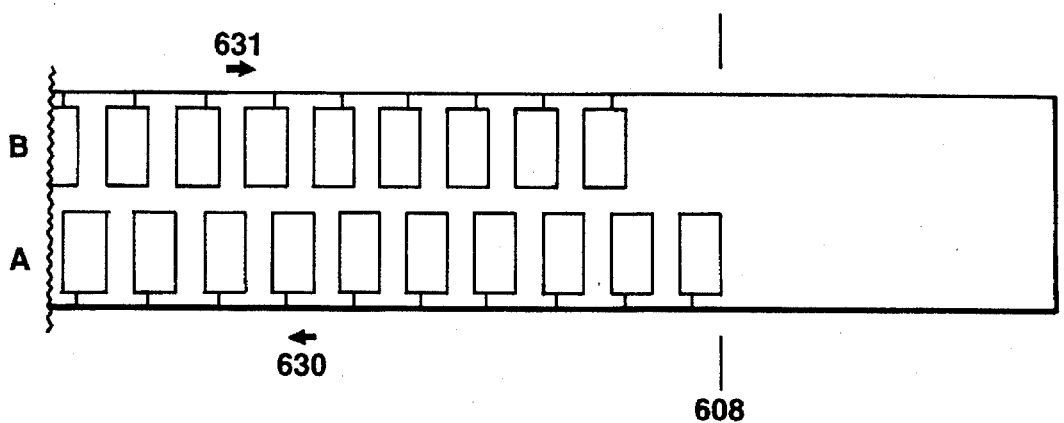

FIGS. 38(a) and 35(b) illustrate a leading-edge portion and a trailing-edge portion of the film, respectively, in the ninth embodiment. As in the sixth embodiment, first, the film is mounted in the photographing apparatus 1 after taking out the leading edge 601 of the film from a supply reel 38a and winding a leading-edge portion 620 of the film around a takeup reel 39a. As shown in FIG. 35(a), the photographing apparatus 1 performs leader feeding of a film portion 621, which may already have been exposed to external light, from a position 602 to a position 603. This position is made to be a position to start a photographing operation where the fed amount of the film equals 0. A photographing operation of images on channel A is started from this point 603, serving as a reference position. Images are sequentially photographed while feeding the film in the direction of an arrow 630. The fed amount of the film increases as 0→1→2→3→ as a result of calculating the fed amount of the film based on signals from the film encoder 505a. When the photographed image has reached a position 608 in the vicinity of the trailing edge of the film shown in FIG. 35(b), the photographing operation on channel A is terminated, and the photographing operation is switched to channel B. At that time, the fed amount of the film on channel A has increased to 127.

Figure 36:
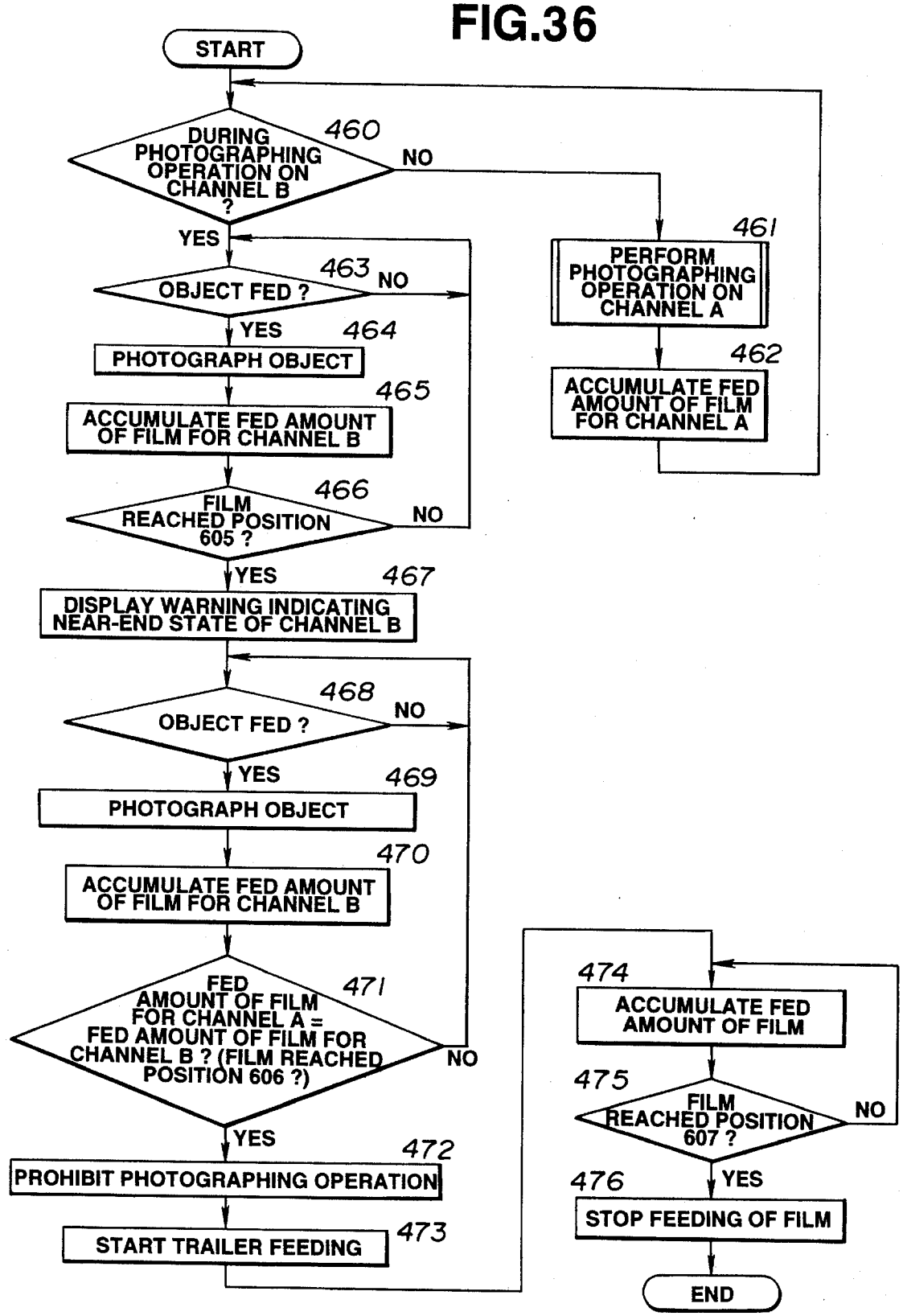
FIG. 36 is a flowchart illustrating the processing in the ninth embodiment.

In FIG. 35(b), when the photographing operation is switched to channel B, the direction of film feeding is changed to the direction of an arrow 631 shown in FIG. 35(a), and the fed amount of the film is made to be 0 at this point. While images are sequentially photographed by feeding the film, the Fed amount of the film is calculated and added as 0→1→2→3→based on signals from the film encoder 505. When the photographing operation on channel B has reached a position 605 shown in FIG. 35(a), the film is at a near end of channel B and a warning indicating the near end is generated. When the photographing operation on channel B has been continued and reached a position 604, the fed amount of the film for channel B becomes 127 which equals the fed amount for channel A. Hence, if the photographing operation is further continued, the photographed image enters a region 623 which has been exposed to external light when the film has been loaded. Accordingly, the photographing operation is forcibly prohibited when the photographed image has reached a position 606. As in the sixth embodiment, the entire photographing operation is completed after Feeding the film to a position A series of operations described above will be explained with reference to the flowchart shown in FIG. 36.

First, if the result of determination in step 460 indicates a photographing operation on channel A, the photographing operation on channel A is continued in step 461, and the fed amount of the film for channel A is accumulated (step 462). If the result of determination in step 460 indicates a photographing operation on channel B, and the result of determination in step 463 indicates that an object to be photographed has been fed, the object is photographed in step 464. Since the film has also been fed, the fed amount of the film for channel B is accumulated in step 465. If the near end of channel B calculated from the fed amount of the film on channel A is in the vicinity of the position 605, it is determined if the accumulated fed amount of the film has reached the position 605 (step 466). If the result of the determination is affirmative, a warning indicating the near end of channel B is provided in step 467. If the feeding of objects is continued (step 468), the photographing operation (step 469) and accumulation of the fed amount of the film (step 470) are executed. If the result of the accumulation indicates in step 471 that the fed amount of the film for channel A equals the fed amount of the film for channel B (i.e., the film reached the position 606), the photographing operation cannot be further performed. Hence, the photographing operation is prohibited in step 472, and trailer feeding is started (step 473). If the result of the accumulation of the fed amount of the film in the trailer Feeding in step 474 indicates that the film has reached the position 607 (step 475), the feeding of the film is stopped in step 476, and the photographing operation is terminated.

As described above, in the ninth embodiment, in a reciprocating photographing operation of images, the position to start a photographing operation on channel A is stored, and the photographing operation is prohibited when a photographing operation on channel B reaches the starting position.

Tenth Embodiment

In a tenth embodiment of the present invention, in a reciprocating photographing operation of images on a long microfilm, an odometer, in which the position to start a photographing operation on channel A is made to be 0, is displayed, and the value displayed on the odometer is reduced in a photographing operation on channel B after inserting the film.

Figure 37A:
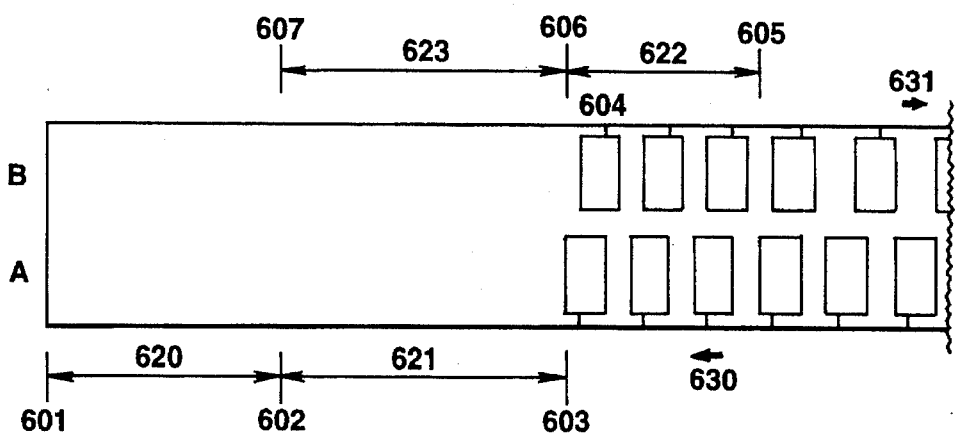
FIGS. 37(a) and 37(b) illustrate a duo film in a tenth embodiment of the present invention.
Figure 37B:
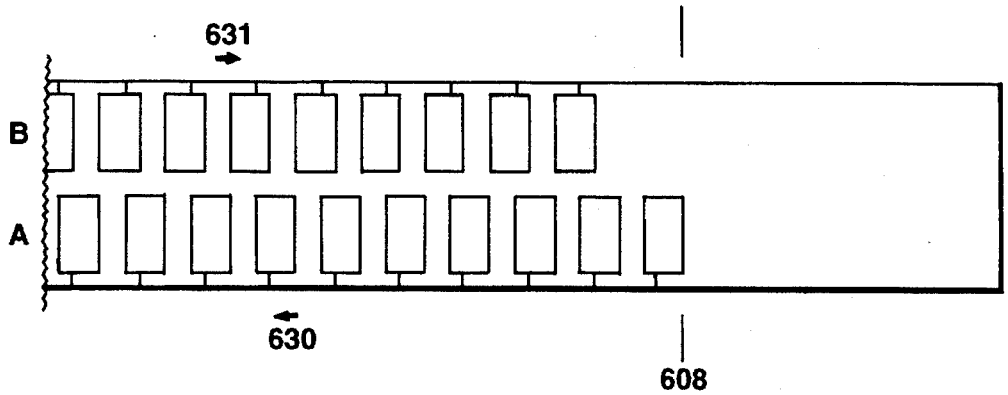

FIGS. 37(a) and 37(b) illustrate a leading-edge portion and a trailing-edge portion of the film, respectively, and displays of film positions on the odometer in the tenth embodiment. As in the sixth embodiment, first, the film is mounted in the photographing apparatus 1 after taking out the leading edge 601 of the film from a supply reel 38a and winding a leading-edge portion 620 of the film around a takeup reel 39a. As shown in FIG. 37(a), the photographing apparatus 1 performs leader feeding of a film portion 621, which may already have been exposed to external light, from a position 602 to a position 603. This position is displayed as a value 0.0 of the odometer (where the fed amount of the film equals 0). A photographing operation of images on channel A is started from this point 603, serving as a reference position. Images are sequentially photographed while feeding the film in the direction of an arrow 630, the value of the display on the odometer increases as 0.0→1.0→2.0→as a result of calculating the fed amount of the film based on signals from the film encoder 505a. When the photographed image has reached a position 608 in the vicinity of the B trailing edge of the film shown in FIG. 37(b), the value of the odometer becomes 287.0. The photographing operation on channel A is terminated in this state, and the photographing operation is switched to channel B. However, the value of the odometer is left to be the value 287.0 for channel A although the film has been inverted.

In FIG. 37(b), when the photographing operation is switched to channel B, the direction of film feeding is changed to the direction of an arrow 631, but the value of the odometer remains 287.0. While images are sequentially photographed by feeding the film, the fed amount of the film is calculated and the value of the odometer is reduced as 287.0→286.0→285.0→based on signals from the film encoder 505. When the photographing operation on channel B has reached a position 605 shown in FIG. 37(a), the film is at a near end of channel B. The fact that the film comes close to the near end can be known by confirming that the value of the odometer changes as 5.0→4.0→3.0. When the photographing operation on channel B has been continued and has reached a position 604, the value of the odometer becomes 0.0, and the photographing operation is prohibited.

Figure 38:
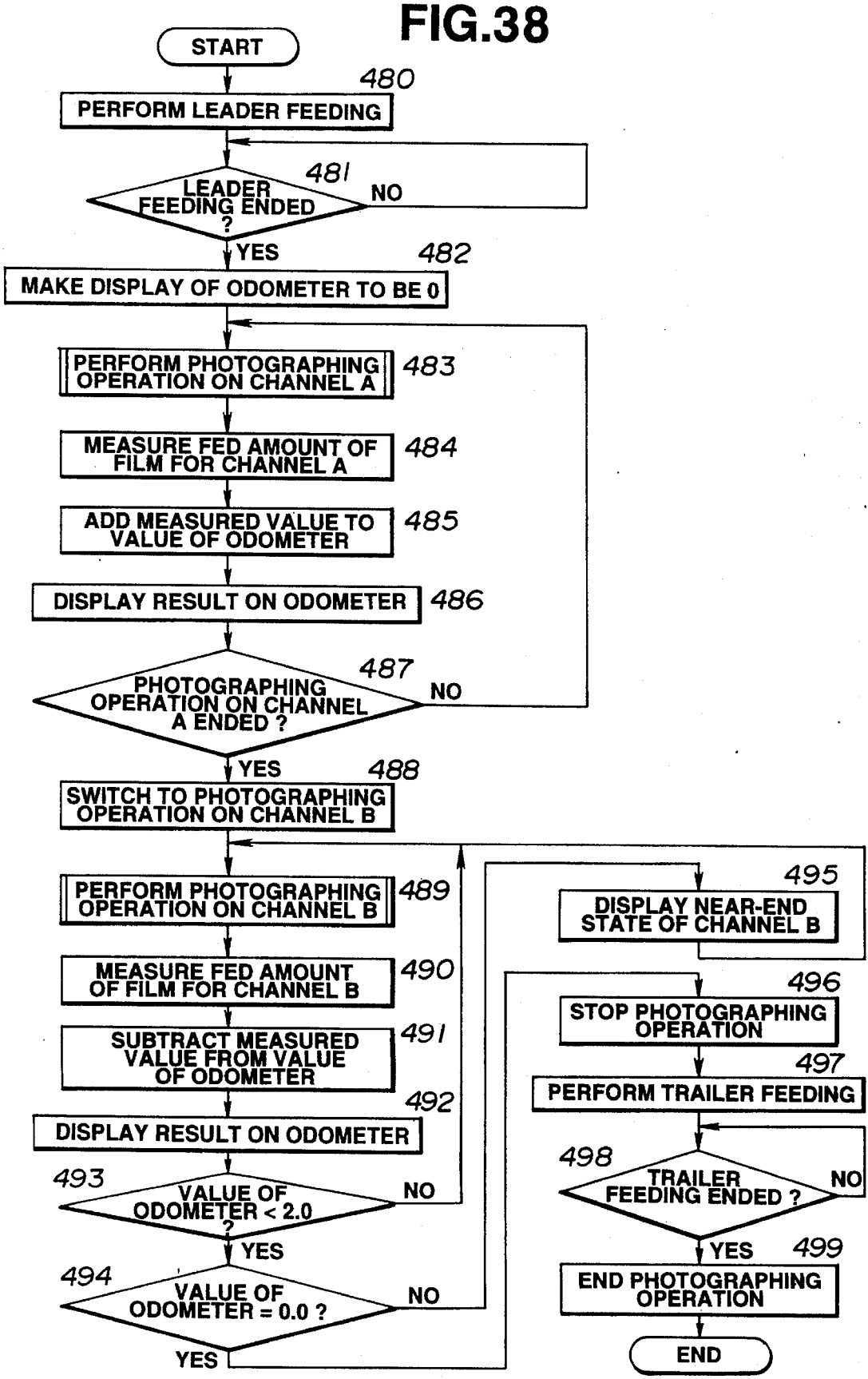
FIG. 38 is a flowchart illustrating the processing in the tenth embodiment.

A series of operations described above will be explained with reference to the flowchart shown in FIG. 38.

First, leader feeding of the leading edge of the film is performed in step 480, and it is awaited until the leader feeding is terminated (step 481). Upon completion of the leader feeding, the display of the odometer is initialized to 0.0 in step 482, and a photographing operation on channel A is performed (step 483). At that same time, the fed amount of the film is measured in step 484. The result of the measurement is added to the value of the odometer (step 485), and the resultant value is displayed on the display device 28 of the control unit 26 (step 486). This processing is repeated until the photographing operation on channel A is completed (step 487). Upon completion of the photographing operation on channel A, the film is inverted to channel B, and a photographing operation on channel B is performed in step 489. At the same time, the fed amount of the film is measured in step 490. The result of the measurement is subtracted from the value of the odometer (step 491), and the resultant value is displayed on the display 28 of the control unit 2B (step 492). In the tenth embodiment, a near end of channel B is set to a value of the odometer equal to or less than 2.0. Hence, if the calculated value of the odometer is equal to or greater than 2.0 in step 493, the photographing operation on channel B is continued. If the calculated value of the odometer becomes less than 2.0, the Film comes to the near end, so that the display indicating the near end is performed in step 495. When the value of the odometer has become 0.0 in step 494, the photographing operation is stopped (step 496), and trailer feeding is performed (step 497). When the film has been fed by a predetermined amount, the trailer feeding is terminated (step 498), and the film is taken out and the photographing operation is terminated (step 499).

As described above, in the tenth embodiment, in a reciprocating photographing operation of images, the position where leader feeding on channel A has been completed is displayed as a value 0.0 of the odometer. The value of the odometer is increased when feeding the film or performing the photographing operation on channel A, and the value of the odometer is reduced from the increased value of the odometer for channel A during a photographing operation on channel B. Thus, it is possible to display the remaining photographable amount of the film on channel B in an easily understandable manner.

In the above-described sixth through tenth embodiments, the fed amount of the film and the value of the odometer used for explaining the film-feeding operation may be arbitrarily changed depending on the length of the film and setting.

As described above, in an image-information photographing apparatus including image-information photographing means capable of performing a reciprocating (duo) photographing operation of image information on a long recording medium and measuring means for measuring the fed amount of the long recording medium, when performing a reciprocating photographing operation of images on the recording medium, by first storing the position to start a photographing operation on channel A and accumulating the fed amount of the film (recording medium), the film is assuredly fed to the position to start the photographing operation on channel A and trailer feeding is then performed even if the photographing operation is terminated during a photographing operation on channel B after inverting the film. Accordingly, it is possible to perform a safe photographing operation without exposing images photographed on the film to external light.

When terminating the photographing operation after inverting the direction of the photographing operation, trailer feeding is terminated while leaving a leading-edge portion of the film which has been first wound around a takeup reel. Accordingly, unnecessary trailer feeding is not performed, and therefore the time required to feed the film after the photographing operation has been terminated is shortened.

Since the remaining photographable amount of the film on channel B is measured based on the fed amount of the film for channel A, the remaining amount can be exactly displayed, and the photographing operation can be performed safely up to the end of the photographable region.

When terminating the photographing operation at a position in the vicinity of the end of the photographable region of the film (i.e., the near end of channel B) after inverting the photographing direction, termination of the photographing operation is automatically determined, and feeding of the film is started. Accordingly, the occurrence of a faulty photographic operation is reduced, and the operation time when terminating the photographing operation is shortened.

When performing display on a odometer, the value of the odometer is increased during a photographing operation on channel A, and the value of the odometer is reduced when the photographing operation is switched to channel B after inverting the film, whereby it is possible to instantaneously know the remaining photographable amount of the film on channel B, and to prevent misdetermination during the operation.

The individual components shown in outline or designated by blocks in the drawings are all well known in the photographing apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A photographing apparatus comprising:

a main body;

optical means for projecting an image of an original onto a film;

a camera unit detachably mountable to the body of said apparatus, said camera unit including a case comprising film supply means and film winding means;

holding means disposed on the body of said apparatus for detachably holding said camera unit in a first posture or in a second posture opposite to the first posture; and display means for separately displaying a photographable amount of film within said camera unit when said camera unit is held in the first posture and a photographable amount of film within said camera unit when said camera unit is held in the second posture.

2. A photographing apparatus according to claim 1, wherein said display means is provided on said case.

3. A photographing apparatus according to claim 1, wherein a plurality of camera units can be simultaneously mounted on the body of said apparatus.

4. A photographing apparatus according to claim 1, wherein said camera unit further comprises a photographing lens.

5. A photographing apparatus according to claim 1, further comprising means for discharging said camera unit from said holding means when the photographable amount of film within said camera unit held in one of the first and second postures reaches a predetermined value.

6. A photographing apparatus according to claim 1, further comprising posture detection means for detecting the posture of said camera unit held by said holding means, wherein photographable region of the film within said camera unit is displayed on said display means based on the posture detected by said posture detection means.

7. A photographing apparatus according to claim 1, wherein images of originals are photographed along a row on a first portion on the film within said camera unit when said camera unit is held in the first posture, and images of originals are photographed along a row on a second portion on the film when said camera unit is held in the second posture.

8. A photographing apparatus according to claim 7, wherein a photographable amount of film on the first row of the film and a photographable amount of film on the second row of the film are displayed in parallel.

9. A photographing apparatus according to claim 1, wherein said camera unit further comprises a memory for storing the photographable amount of film, and a backup power supply, wherein said display means is provided on said case, and wherein the photographable amount of film stored in said memory is displayed on said display means after said camera unit has been detached from said holding means.

10. A photographing apparatus according to claim 9, further comprising means for exchanging electrical signals between the body of said apparatus and said camera unit.

11. A photographing apparatus according to claim 1, wherein images of originals are photographed on an upper half of the film within said camera unit when said camera unit is held in the first posture, and wherein images of originals are photographed on a lower half of the film when said camera unit is held in the second posture.

12. A photographing apparatus according to claim 11, wherein said display means displays the photographable amount of film for the upper half of the film and the photographable amount of film for the lower half of the film in parallel.

13. A photographing apparatus according to claim 1, further comprising storage means for storing a position to start a photographing operation on the film within said camera unit, and means for determining a position to terminate the photographing operation on the film based on the position to start the photographing operation stored in said storage means.

14. A camera unit detachably mountable to a photographing apparatus in a first posture or in a second posture, different from the first posture, said camera unit comprising:

a case for accommodating a film;

film supply means disposed within said case;

film winding means disposed within said case; and display means disposed on a side of said case, wherein said display means separately displays an amount of photographable film on an upper half of the film within said case and an amount of photographable film on a lower half of the film.

15. A camera unit according to claim 14, wherein said case comprises a photographing lens.

16. A camera unit according to claim 14, wherein said case comprises storage means for storing a photographable amount of the film, and a power supply for operating said display means and said storage means.

17. A camera unit according to claim 14, wherein said camera unit is mountable in a first posture or in a second posture which is opposite to the first posture, and wherein images are photographed on the upper half of the film when said camera unit is mounted in the first posture, and images are photographed on the lower half of the film when said camera unit is mounted in the second posture.

18. A photographing apparatus for photographing images along a first row and along a second row of a film, said apparatus comprising:

a main body;

optical means for projecting images of originals onto the first row and the second row of the film;

a film accommodating case detachably mountable to the main body of said apparatus in a first posture or in a second posture opposite to the first posture;

means for moving the film wound around a supply reel within said case to a takeup reel; and display means disposed on said case for displaying an amount of photographable film on the first row of the film, and an amount of photographable film on the second row of the film.

19. A photographing apparatus according to claim 18, wherein said display means displays a row of the film on which images can be photographed when said case is mounted in a main body of said apparatus.

20. A photographing apparatus according to claim 18, wherein said case comprises means for storing the amounts of photographable film on the respective rows, and a backup power supply.

21. A photographing apparatus according to claim 18, further comprising storage means for storing a position to start a photographing operation on the first row of the film, and means for determining a position to terminate a photographing operation on the second row of the film based on the position to start the photographing operation stored in said storage means.

* * * * *

UNITED STATES PATENT AND TRADEMARK OFFICE
CERTIFICATE OF CORRECTION

PATENT NO. : 5,619,303
DATED : April 8, 1997
INVENTOR(S) : MASASHI YAHARA, ET AL.

It is certified that error appears in the above-identified patent and that said Letters Patent is hereby corrected as shown below:

COLUMN 9

Line 10, "them in." should read --them in an upside-down state.--

COLUMN 12

Line 66, "Film" should read --film--.

COLUMN 17

Line 63, "Feel 39a," should read --reel 39a,--.

UNITED STATES PATENT AND TRADEMARK OFFICE
CERTIFICATE OF CORRECTION

PATENT NO. : 5,619,303         Page 2 of 2
DATED      : April 8, 1997
INVENTOR(S): MASASHI YAHARA, ET AL.

It is certified that error appears in the above-identified patent and that said Letters Patent is hereby corrected as shown below:

COLUMN 21

Line 23, "Fed" should read --fed--.
    Line 38, "Feeding" should read --feeding--.
    Line 66, "feeding" should read --feeding--.

COLUMN 23

Line 17, "Film" should read --film--.

Signed and Sealed this

Sixteenth Day of September, 1997

Attest:

BRUCE LEHMAN

Attesting Officer        Commissioner of Patents and Trademarks